US011348039B2

(12) United States Patent
Spiegel et al.

(10) Patent No.: US 11,348,039 B2
(45) Date of Patent: May 31, 2022

(54) TICKET INFORMATION DISPLAY SYSTEM

(71) Applicant: Snap Inc., Santa Monica, CA (US)

(72) Inventors: Evan Spiegel, Los Angeles, CA (US); Dylan Shane Eirinberg, Venice, CA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/247,640

(22) Filed: Dec. 18, 2020

(65) Prior Publication Data

US 2021/0192399 A1 Jun. 24, 2021

Related U.S. Application Data

(60) Provisional application No. 62/950,102, filed on Dec. 18, 2019.

(51) Int. Cl.
*G06Q 10/02* (2012.01)
*A63J 25/00* (2009.01)
*G06Q 30/06* (2012.01)

(52) U.S. Cl.
CPC .............. *G06Q 10/02* (2013.01); *A63J 25/00* (2013.01); *G06Q 30/0643* (2013.01)

(58) Field of Classification Search
CPC ............................ G06Q 10/02; G06Q 10/025
See application file for complete search history.

(56) References Cited

U.S. PATENT DOCUMENTS

| 5,797,126 A | * | 8/1998 | Helbling | G07B 15/00 705/5 |
| 8,676,615 B2 | | 3/2014 | Callaghan et al. | |
| 10,699,221 B2 | | 6/2020 | Paleja et al. | |
| 2007/0066397 A1 | * | 3/2007 | Nammi | G06Q 10/02 463/42 |

(Continued)

FOREIGN PATENT DOCUMENTS

| KR | 20150085738 A | 7/2015 |
| KR | 20170066065 A | 6/2017 |

(Continued)

OTHER PUBLICATIONS theatermanager.com, Venue Management, available at https://help.theatremanager.com/book/export/html/213, WebArchive copy dated Jul. 28, 2015 (Year: 2015).*

(Continued)

*Primary Examiner* — Daniel Vetter
(74) *Attorney, Agent, or Firm* — Schwegman Lundberg & Woessner, P.A.

(57) ABSTRACT

Examples generate and operate a unitary, or composite, interface, having a number of sections or portions that are concurrently and persistently displayed, and using which a user can conveniently navigate through a reserved seat selection process, from selecting a particular theater or venue, through to the final seat selection. In addition, the example unitary interface also proposes various features and mechanisms to enable the user to conveniently locate and purchase a desired or acceptable ticket (e.g., one that is located at a good a viewing angle relative to a screen, or that is contiguously located next to other available seats for friends and family).

30 Claims, 15 Drawing Sheets

(56) References Cited

U.S. PATENT DOCUMENTS

| | | | | |
|---|---|---|---|---|
| 2008/0103934 A1* | 5/2008 | Gibson | | G06Q 10/02 |
| | | | | 705/5 |
| 2010/0082374 A1* | 4/2010 | Charania | | G06Q 30/0601 |
| | | | | 705/5 |
| 2010/0106607 A1* | 4/2010 | Riddiford | | G06Q 30/0603 |
| | | | | 705/15 |
| 2012/0078667 A1* | 3/2012 | Denker | | G06Q 30/0643 |
| | | | | 705/5 |
| 2013/0268973 A1 | 10/2013 | Archibong et al. | | |
| 2015/0012312 A1* | 1/2015 | Eden | | G06F 3/04842 |
| | | | | 705/5 |
| 2015/0100354 A1* | 4/2015 | Horowitz | | G06Q 10/02 |
| | | | | 705/5 |
| 2016/0148123 A1* | 5/2016 | Paleja | | G06K 19/06037 |
| | | | | 705/5 |
| 2016/0148124 A1* | 5/2016 | Paleja | | G06Q 30/0269 |
| | | | | 705/5 |
| 2016/0259500 A1* | 9/2016 | Greenwald | | G06F 3/04847 |
| 2018/0197119 A1* | 7/2018 | Sunshine | | G06Q 30/0269 |
| 2019/0187949 A1* | 6/2019 | Sugimoto | | G07F 17/16 |
| 2019/0347581 A1 | 11/2019 | Paleja et al. | | |
| 2020/0363933 A1* | 11/2020 | Sica | | G06F 3/0482 |

FOREIGN PATENT DOCUMENTS

| | | |
|---|---|---|
| KR | 20190030194 A | 3/2019 |
| KR | 20190063906 A | 6/2019 |
| WO | WO-2021127383 A1 | 6/2021 |

OTHER PUBLICATIONS

Lieberman, AMC Theaters Plans Switch to Reserved Seating at All Manhattan Venues, Deadline, Aug. 16, 2016 (Year: 2016).*

"International Application Serial No. PCT/US2020/065927, International Search Report dated Apr. 27, 2021", 5 pgs.

"International Application Serial No. PCT/US2020/065927, Written Opinion dated Apr. 27, 2021", 5 pgs.

"International Application Serial No. PCT/US2020/065927, International Preliminary Report on Patentability dated Jan. 27, 2022", 6 pgs.

* cited by examiner

TICKET INFORMATION DISPLAY SYSTEM

CLAIM OF PRIORITY

This application claims the benefit of priority to U.S. Provisional Application Ser. No. 62/950,102, filed on Dec. 18, 2019, which is incorporated herein by reference in its entirety.

BACKGROUND

Current systems for the purchasing of tickets to events (e.g., the purchasing of movie tickets to a movie show) can be quite cumbersome and slow, particularly when attempting to attend a movie with friends and family. Regardless of whether attempting to make such ticket purchases through a mobile application or a web interface for a ticket purchasing system, a user typically has to navigate through multiple different screens to purchase a ticket. Multiple choices for the movies and show times are also presented on different screens following a cumbersome login. Additional details need to be provided to complete the purchase (e.g., whether a ticket is being purchased for an adult or a child). The machine-person interfaces, as presented by current ticket purchasing systems, present a number of technical problems, particularly related to the machine-human interactions and interfaces through current interface designs and interaction sequences.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Reserved seating at public events (e.g., movie screenings, sports events, and concerts) typically includes both reserved and unreserved seating. There is an increasing trend towards reserved seating, particularly with respect to movie screenings within movie theaters. However, enabling a user to navigate through multiple selection options to a point where the user can conveniently select a ticket with a reserved seat is currently a very slow process. Further, when a user finally navigates to a seat selection screen, the user is often unable to find an acceptable seat because of undesirable seat locations, or because, for example, the user would like to attend with some friends or family and is looking for a number of contiguous seats so that the party can all sit together. When a user is unable to locate a suitable seat, or seats, within a seat selection screen, the user is then required, with great inconvenience, to start the whole navigation process over again, through multiple interfaces. This inconvenience may be magnified when attempting to navigate a mobile user interface.

Examples seek to address these inconveniences and technical problems in currently existing machine-person interfaces by presenting a unitary, or composite, interface, having a number of sections or portions that are concurrently and persistently displayed, and using which a user can conveniently navigate through a reserved seat selection process, from selecting a particular theater or venue, through to the final seat selection. In addition, the example unitary interface also proposes various features and mechanisms to enable the user conveniently to locate and purchase a desired or acceptable ticket (e.g., one that is located at a good a viewing angle relative to a screen, or that is contiguously located next to other available seats for friends and family).

Figure 1:
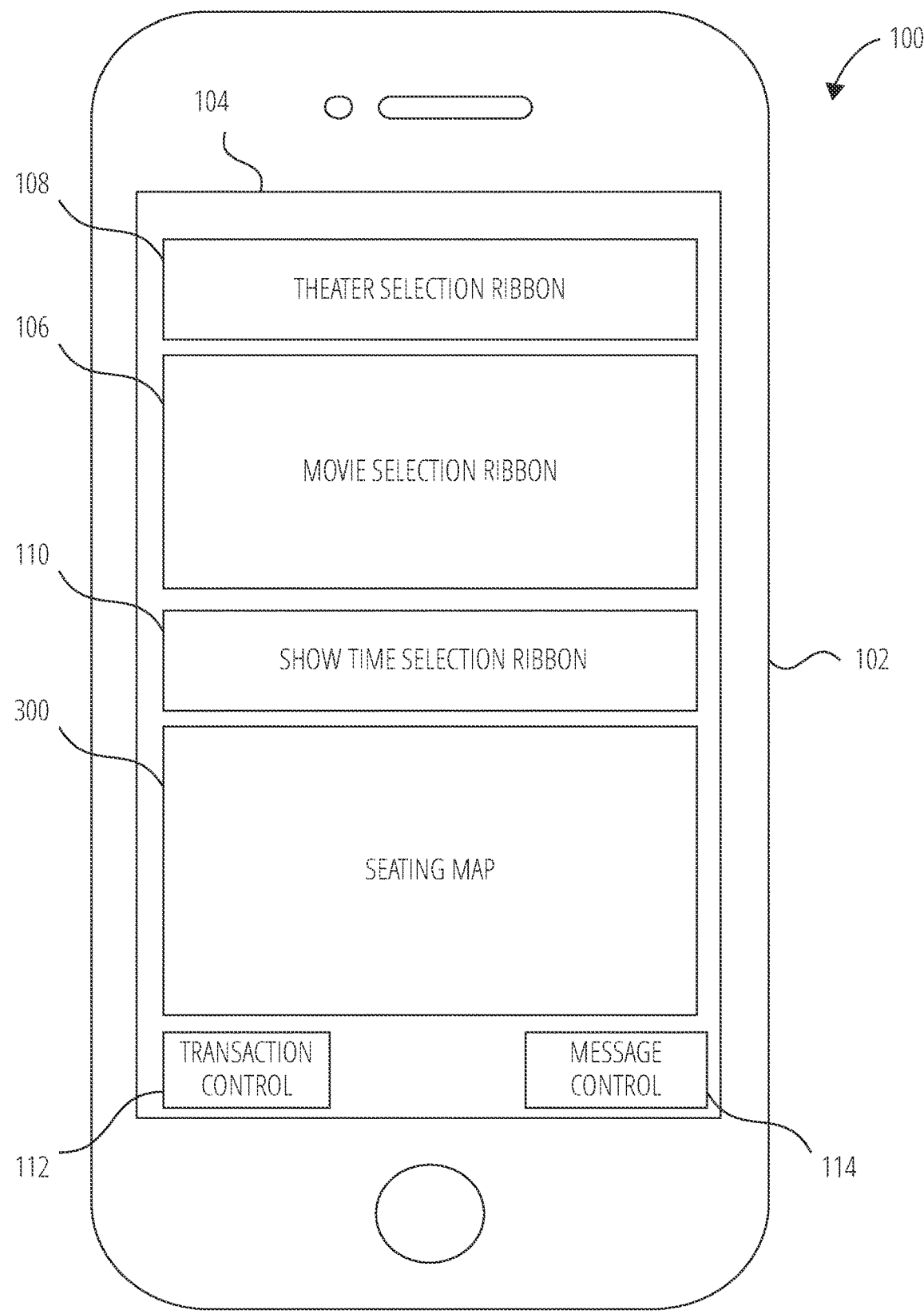
FIG. 1 illustrates a client device 100 in accordance with some examples.

FIG. 1 is a diagrammatic representation of a client device 100, in the example form or a mobile phone 102, having a screen presenting a unitary, or composite, user interface 104 that contemporaneously displays a number of sections or portions that enable convenient navigation through a number of selection choices for the purchase of a seat ticket within a movie theater for a particular movie screening at a particular show time. While the example examples described herein are described within the context of reserving a seat within a movie theater, other examples may be implemented to reserve a seat or location at other types of events or venues (e.g., concert seating at a concert event).

The composite user interface 104 includes a number of sections or portions, namely a venue selection portion, in the example form of a theater selection ribbon 108, within which the user can swipe left or right to select between movie theaters within a predetermined geographic proximity (e.g., determined based on a GPS location of the mobile phone 102). The theater selection ribbon 108 may also enable a user to input a current ZIP Code, or other geographic information, in order to identify a selection of theaters for which indicia may be displayed and navigated through within the theater selection ribbon 108. The theater selection ribbon 108 also enables a user to provide a movie theater selection by tapping or otherwise selecting an indicium associated with a particular movie theater within the theater selection ribbon 108.

A user, having performed a theater selection within the context of the theater selection ribbon 108, then advances to an event selection portion, in the example form of a movie selection ribbon 106, in which are displayed indicia (e.g., pictures or videos) for movies that are currently is screening at the selected movie theater. To this extent, the contents of the movie selection ribbon 106 are dynamically adjusted and modified responsive to the selection of a theater within theater selection ribbon 108. Again, a user is able to swipe left and swipe right to scroll through the various movie indicia displayed within the movie selection ribbon 106, and tap on a particular indicium in order to select a movie.

Responsive to a movie selection, content within a time selection portion, in the example form of a show time selection ribbon 110, is dynamically generated and/or updated to include indicia for available show times for the selected movie within the selected theater. The show times may again be indicated as indicium that can be swiped to the left or right to scroll through the available options, each of the indicium being a user-selectable to select a specific show time.

Responsive to selection of a show time for a particular movie within a particular theater, content in a seating map portion, in the example form of the seating map 300, is dynamically generated in near real-time. The seating map 300 displays seating information for the selected show time of the selected movie within the selected theater, and may show the position of each seat within the theater relative to a screen (or stage in the case of a live performance). In the case of a live sporting event, the seating map 300 displays a seating arrangement relative to an arena, field, rink or other activity area.

As will be described in further detail below, in addition to showing the location of all or a subset of seats within a particular venue, the seating map 300 may also indicate seat availability by visually distinguishing, or otherwise flagging, seats that are available in contradistinction to those that are unavailable or booked. Further, the seating map 300 may also, in some examples, provide graphical representations or indicium representative of friends or socially-related entities that have booked particular seats within a particular venue. This display of "friend" information is helpful when attending an event with friends, as it allows a user conveniently to choose reserved seating in a desired proximity to such friends.

Accordingly, it will be appreciated that the theater selection ribbon 108, movie selection ribbon 106, show time selection ribbon 110 and seating map 300, by being concurrently and persistently shown within the user interface 104 during a seat selection process, enable a user to navigate between multiple selection options with relative ease. Further, selection options are conveniently presented within the context of earlier selections during the entire navigation and seat selection process. The user interface arrangement shown in FIG. 1 further provides, in some examples, a hierarchical flow where selections in a higher-level menu dynamically impact selection choices offered in a subsequent menu level, with each of the options being presented in a convenient ribbon that a user can swipe left or swipe right to review options.

The user interface 104 furthermore includes a transaction control 112, which is user-selectable to initiate a purchase transaction for a particular available seat, selected within the seating map 300.

A message control 114 also allows a user to communicate information regarding a particular seat transaction (e.g., purchase) to a select group of recipients (e.g., "friends," as reflected within a social network data structure, that are located within a predetermined geographic proximity of the relevant user). Specifically, user selection of the message control 114 may initiate a process whereby a message, indicating the theater selection, movie selection, show time selection, and seat selection is communicated to a social network friend, and presented in such a way that a user interface, similar to the user interface 104, is presented to the friend. This interface then allows a friend, as a receiving user, to similarly select and purchase an available seat from within the seating map 300, with the knowledge of where the sending user is seated in the theater, and also where any other social network friends of the receiving user may be seated within the relevant venue.

Figure 2:
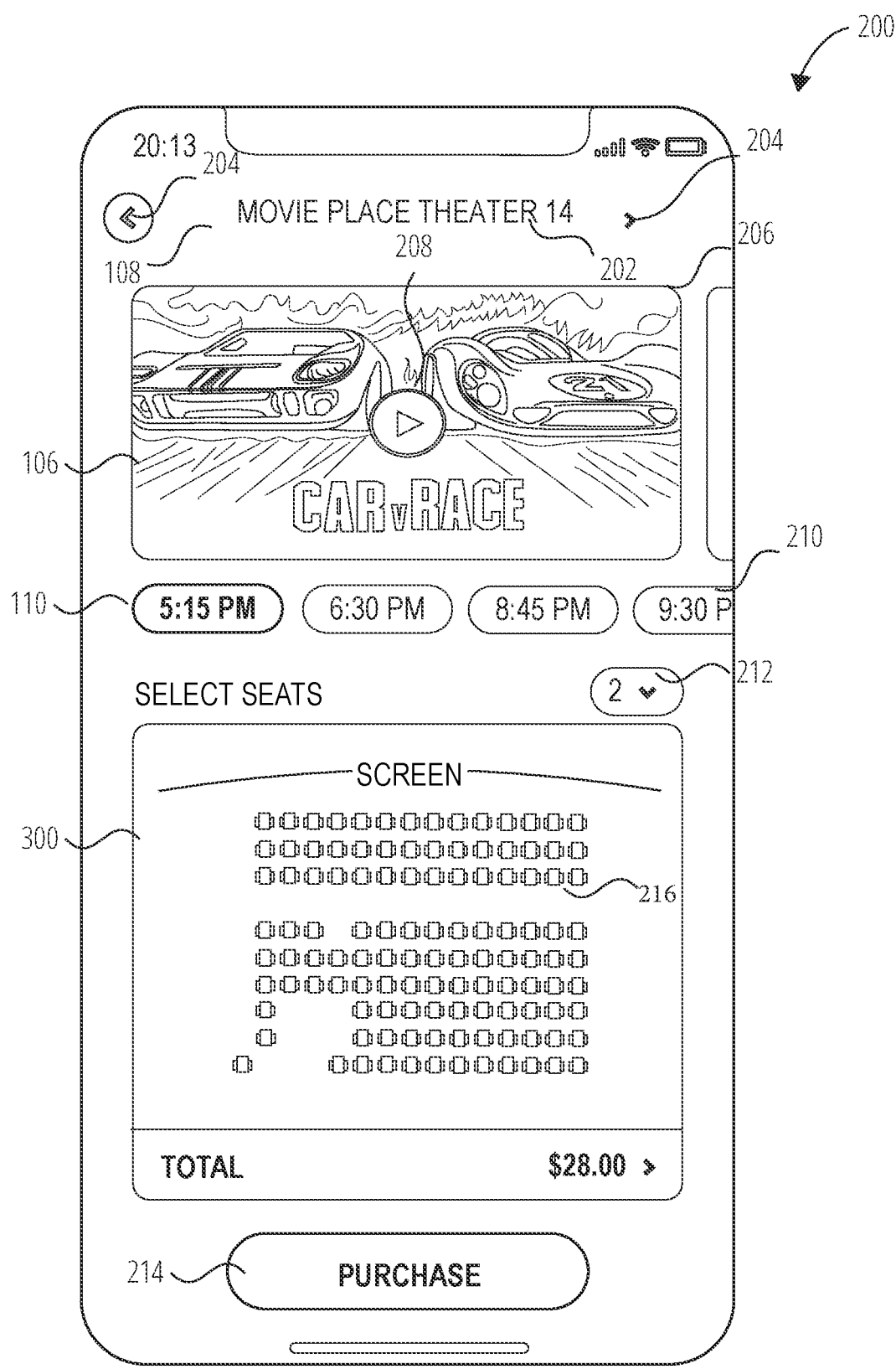
FIG. 2 illustrates a ticket user interface 200 in accordance with some examples.

FIG. 2 is a screenshot of a composite ticket user interface 200, according to some examples, showing the specific examples of content of the various interface portions, discussed above with reference to FIG. 1. The theater selection ribbon 108 is shown to include multiple theater indicia 202, which the user can scroll left or right using scroll buttons 204. The set of theaters for which theater indicia 202 are shown within the theater selection ribbon 108 is determined, in some examples, using a geographic information (e.g., GPS coordinates) determined by a mobile device on which the ticket user interface 2000 is displayed. The list of theaters presented within the theater selection ribbon 108 may, for example, be within a 5, 10 or 15-mile radius of the location of the client device 100.

Based on the selection of a particular theater within the theater selection ribbon 108, movie indicia 206 are generated and shown within the movie selection ribbon 106. To navigate between the movie indicium 206, a user can swipe left, or swipe right, and conveniently initiate the playback of a trailer (or other multimedia content) related to the movie by selection of the trailer (or preview) play button 208. The movie indicium 206 for any particular movie may also display other information helpful to a user in selecting a movie, such as title, name of actors, and various graphics and images.

The show time selection ribbon 110 displays, based on the movie theater and movie selections, a set of show times, each represented by a show time indicium 210. Each of the show time indicium 210 is user selectable to select a particular show time for the relevant movie in the relevant theater.

Based on the combined theater, movie and show time selection, the content of the seating map 300 is retrieved as a real-time, or near real-time, data and displayed within the ticket user interface 200. The seating map 300, shown in FIG. 2, shows the location of a screen with a theater, as well as a location for each seat ticket that is currently available for purchase. In the example, taken or unavailable seats are simply not shown (e.g., an indicium for the relevant seat is not displayed). In some examples, the seat indicium for available seats may be displayed in a visually distinguishable way from indicium for seats that are not available, so that the user is readily and visually able to discern which seats are available for purchase. Seats selected by the user, within the seating map 300, are also visually distinguished (e.g., the two blue seat indicium). A ticket number selector 212 allows a user to specify the number of tickets that are desired, and a single touch on the display screen of the mobile device, within the seating map 300, results in selection of the requested number of seats. Further, the seating map 300 is zoomable by a user (e.g., using a touchscreen) so that a user can zoom in on a particular subset of seats within a relevant venue.

Having performed the seat selection within the context of the seating map 300, a user may then initiate a purchase transaction related to the selected seats using a purchase button 214.

Figure 3:
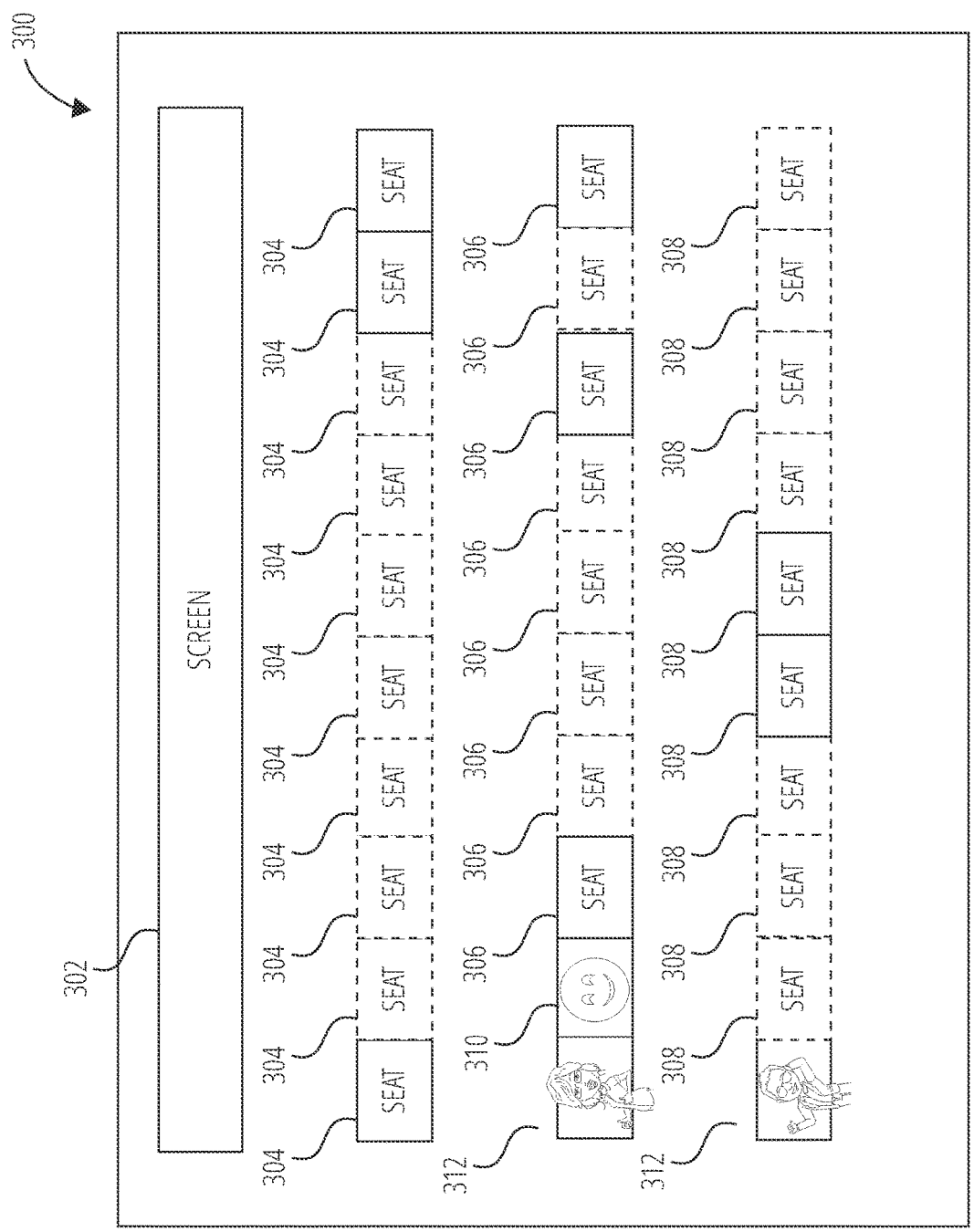
FIG. 3 illustrates a seating map 300 in accordance with some examples.

FIG. 3 is a diagrammatic representation of further details of a seating map 300, according to some examples. The seating map 300 depicts a location of a screen 302 relative to the location of three rows of seats, namely a first row of seats 304, a second row of seats 306, and a third row of seats 308.

Seats that are taken or reserved, are shown in solid line, whereas seats that are available for reservation are shown in broken line. In some examples, any manner of visually distinguishing reserved (e.g., unavailable) from unreserved (e.g., available) seats may be used within the context of the seating map 300.

The seating map 300 also includes a user indicium 310 (in this case, ":-)" emoji) associated with a viewing user and superimposed upon a selected seat, to allow the viewing user easily to identify a selected seat. Further, the seating map 300 displays friend indicium 312, superimposed on seats that have been reserved by social network friends of the viewing user. This allows the viewing user to readily identify where friends may be seated, for a particular show time, within a theater and select and reserve available seat nearby to the friends. In some examples, each of the friend indicium 312 graphical representations are customized to be representative of the associated users.

Figure 4:
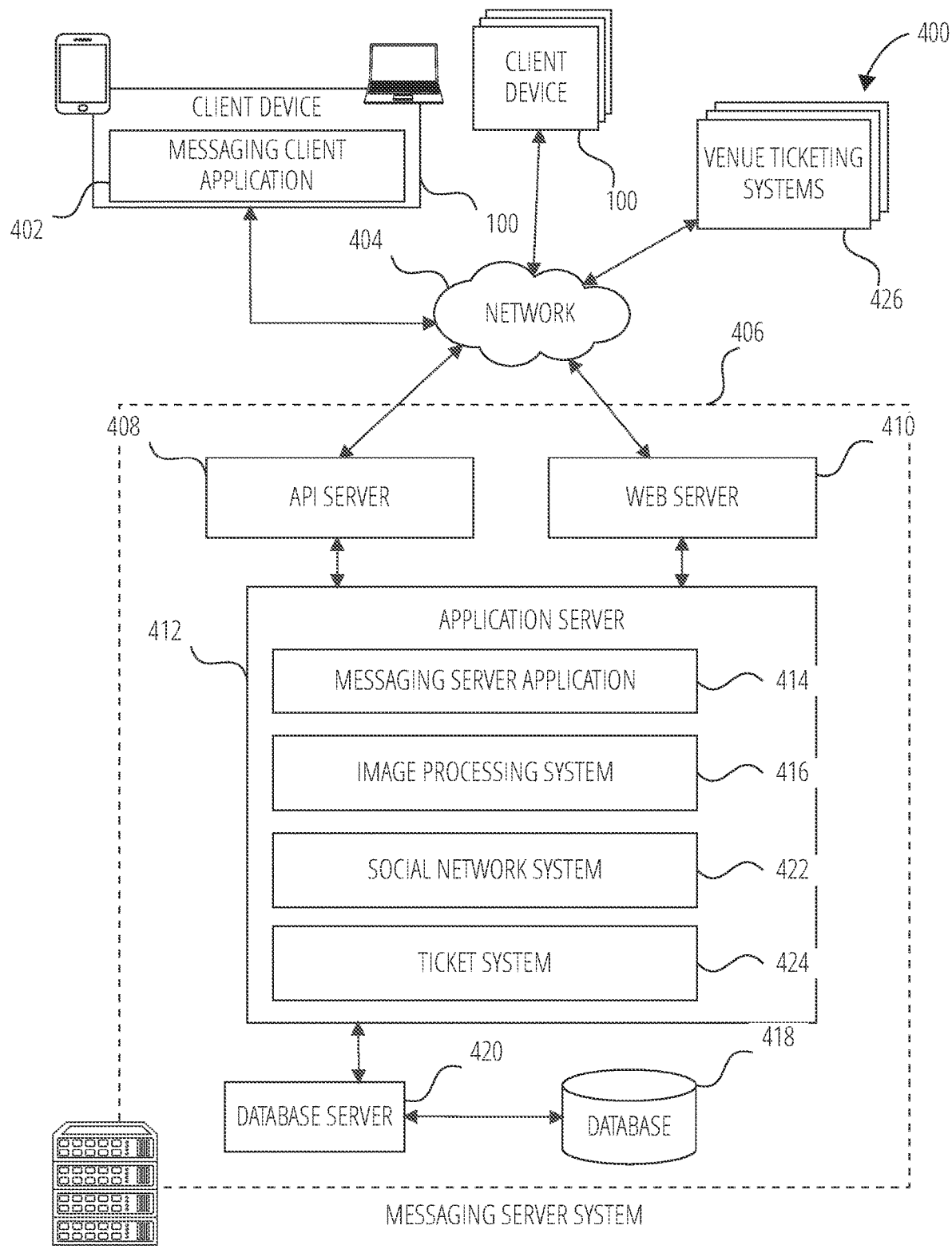
FIG. 4 is a diagrammatic representation of a networked environment in which the present disclosure may be deployed, in accordance with some examples.

FIG. 4 is a block diagram showing an example messaging system 400 for exchanging data (e.g., messages and associated content) over a network. The messaging system 400 includes multiple instances of a client device 100, each of which hosts a number of applications, including a messaging client application 402. Each messaging client application 402 is communicatively coupled to other instances of the messaging client application 402 and a messaging server system 406 via a network 404 (e.g., the Internet).

A messaging client application 402 can communicate and exchange data with another messaging client application 402 and with the messaging server system 406 via the network 404. The data exchanged between messaging client application 402, and between a messaging client application 402 and the messaging server system 406, includes functions (e.g., commands to invoke functions) as well as payload data (e.g., text, audio, video or other multimedia data).

The messaging client application 402 also presents several interfaces to a user to enable messaging functionality, as well as other interfaces to support other functionality provided by the messaging client application 402. In some examples, the ticket user interface 200 discussed above is presented by the messaging client application 402 to a user so as to enable the user to purchase a ticket using the messaging client application 402.

The messaging server system 406 provides server-side functionality via the network 404 to a particular messaging client application 402. While certain functions of the messaging system 400 are described herein as being performed by either a messaging client application 402 or by the messaging server system 406, the location of certain functionality either within the messaging client application 402 or the messaging server system 406 is a design choice. For example, it may be technically preferable to initially deploy certain technology and functionality within the messaging server system 406, but to later migrate this technology and functionality to the messaging client application 402 where a client device 100 has a sufficient processing capacity.

The messaging server system 406 supports various services and operations that are provided to the messaging client application 402. Such operations include transmitting data to, receiving data from, and processing data generated by the messaging client application 402. This data may include, message content, Client Device information, geo-location information, media annotation and overlays, message content persistence conditions, social network information, and live event information, as examples. Data exchanges within the messaging system 400 are invoked and controlled through functions available via user interfaces (UIs) of the messaging client application 402.

Turning now specifically to the messaging server system 406, an Application Program Interface (API) server 408 is coupled to, and provides a programmatic interface to, an application server 412. Similarly, a web server 410 is coupled to, and provides a web interface, to the application server 412. The web server 410 enables interactions by a more generic client application, such as a web browser executing on a client device 100, with the application server 412. The application server 412 is communicatively coupled to a database server 420, which facilitates access to a database 418 in which is stored data associated with messages processed by the application server 412.

The Application Program Interface (API) server 408 receives and transmits message data (e.g., commands and message payloads) between the client device 100 and the application server 412. Specifically, the Application Program Interface (API) server 408 provides a set of interfaces (e.g., methods and protocols) that can be called or queried by the messaging client application 402 in order to invoke functionality of the application server 412. The Application Program Interface (API) server 408 exposes various functions supported by the application server 412, including account registration, login functionality, the sending of messages, via the application server 412, from a particular messaging client application 402 to another messaging client application 402, the sending of media files (e.g., images or video) from a messaging client application 402 to the messaging server application 414, and for possible access by another messaging client application 402, the setting of a collection of media data (e.g., story), the retrieval of a list of friends of a user of a client device 100, the retrieval of such collections, the retrieval of messages and content, the adding and deletion of friends to a social graph, the location of friends within a social graph, and opening an application event (e.g., relating to the messaging client application 402).

The application server 412 hosts a number of applications and subsystems, including a messaging server application 414, an image processing system 416 and a social network system 422. The messaging server application 414 implements a number of message processing technologies and functions, particularly related to the aggregation and other processing of content (e.g., textual and multimedia content) included in messages received from multiple instances of the messaging client application 402. As will be described in further detail, the text and media content from multiple sources may be aggregated into collections of content (e.g., called stories or galleries). These collections are then made available, by the messaging server application 414, to the messaging client application 402. Other Processor and memory intensive processing of data may also be performed server-side by the messaging server application 414, in view of the hardware requirements for such processing.

The application server 412 also includes an image processing system 416 that is dedicated to performing various image processing operations, typically for images or video received within the payload of a message at the messaging server application 414.

Figure 5:
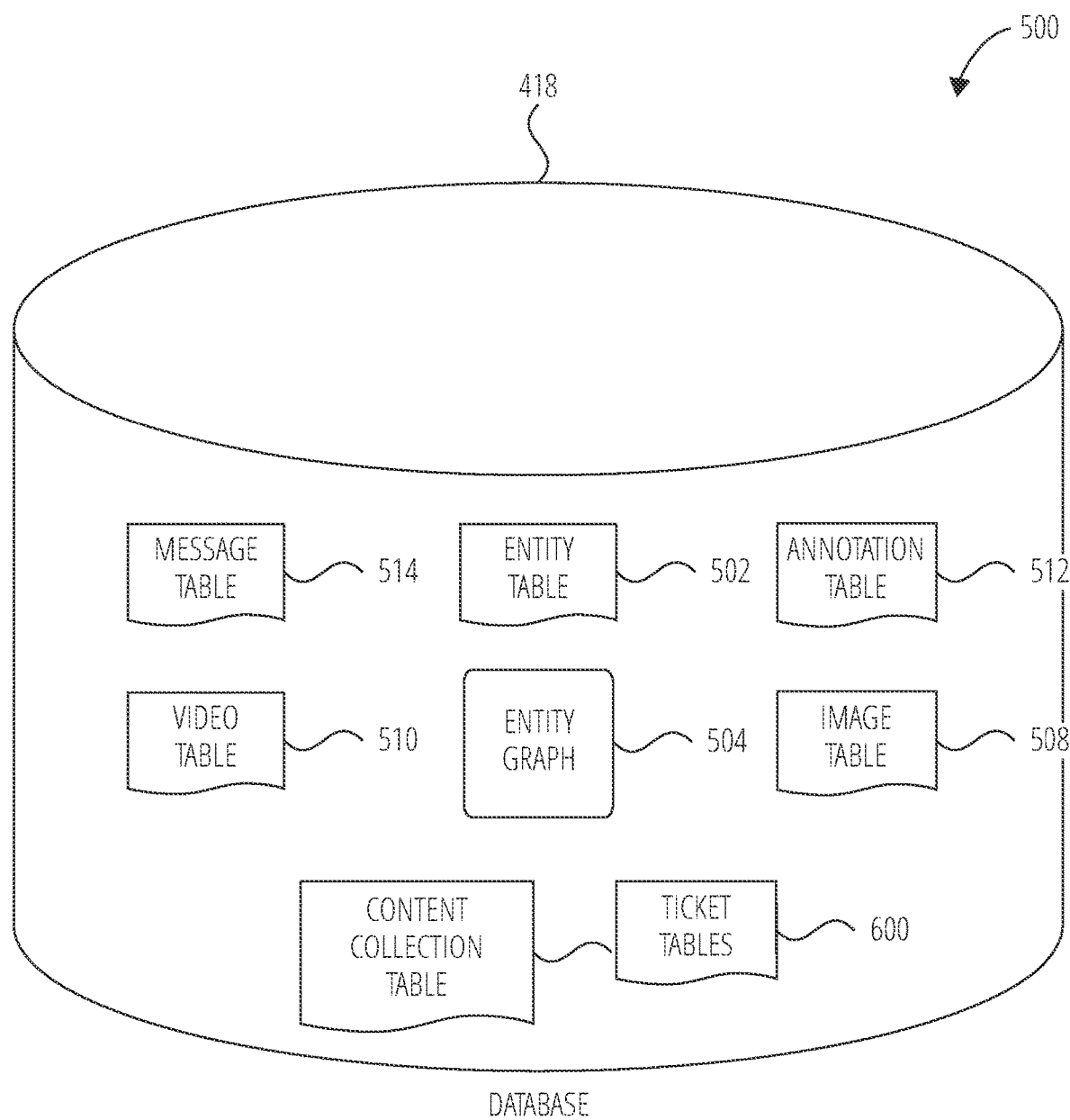
FIG. 5 is a diagrammatic representation of a data structure as maintained in a database, in accordance with some examples.

The social network system 422 supports various social networking functions services, and makes these functions and services available to the messaging server application 414. To this end, the social network system 422 maintains and accesses an entity graph 504 (as shown in FIG. 5) within the database 418. Examples of functions and services supported by the social network system 422 include the identification of other users of the messaging system 400 with which a particular user has relationships or is "following", and also the identification of other entities and interests of a particular user.

The application server 412 is communicatively coupled to a database server 420, which facilitates access to a database 418 in which is stored data associated with messages processed by the messaging server application 414.

Further, the application server 412 includes a ticket system 424, which interacts with ticket purchase functionality provided by the messaging client application 402, in order to generate and display the user interfaces described herein, as well as the navigation and process flows (e.g., the machine-person interactions) supported by those user interfaces. The ticket system 424 also communicates, via the network 404, with third party venue ticketing systems 426, which may be operated by respective venues or other ticket aggregators and resellers, be they primary or secondary market ticket vendors. To this end, the Application Program Interface (API) server 408 includes functionality that allows of the ticket system 424 to automatically retrieve and synchronize, in near real-time, ticket availability and purchase information with the third party venue ticketing systems 426 so as to update data maintained by the ticket system 424 within a database 418.

The ticket system 424 also communicates with the venue ticketing systems 426 in order to complete a purchase transaction with respect to tickets presented by the interfaces described herein.

FIG. 5 is a schematic diagram illustrating data structures 500 which may be stored in the database 418 of the messaging server system 406, according to certain example examples. While the content of the database 418 is shown to comprise a number of tables, it will be appreciated that the data could be stored in other types of data structures (e.g., as an object-oriented database).

The database 418 includes message data stored within a message table 514. The entity table 502 stores entity data, including an entity graph 504. Entities for which records are maintained within the entity table 502 may include individuals, corporate entities, organizations, objects, places, events, etc. Regardless of type, any entity regarding which the messaging server system 406 stores data may be a recognized entity. Each entity is provided with a unique identifier, as well as an entity type identifier (not shown).

The entity graph 504 furthermore stores information regarding relationships and associations between entities. Such relationships may be social, professional (e.g., work at a common corporation or organization) interested-based or activity-based, merely for example.

The database 418 also stores annotation data, in the example form of filters, in an annotation table 512. Filters for which data is stored within the annotation table 512 are associated with and applied to videos (for which data is stored in a video table 510) and/or images (for which data is stored in an image table 508). Filters, in some examples, are overlays that are displayed as overlaid on an image or video during presentation to a recipient user. Filters may be of varies types, including user-selected filters from a gallery of filters presented to a sending user by the messaging client application 402 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 402, based on geolocation information determined by a GPS unit of the client device 100. Another type of filter is a data filter, which may be selectively presented to a sending user by the messaging client application 402, based on other inputs or information gathered by the client device 100 during the message creation process. Example of data filters include current temperature at a specific location, a current speed at which a sending user is traveling, battery life for a client device 100, or the current time.

Other annotation or supplementing data that may be stored within the image table 508 is so-called "lens" data. A "lens" may be a real-time special effect and sound that may be added to an image or a video.

As mentioned above, the video table 510 stores video data which, in some examples, is associated with messages for which records are maintained within the message table 514. Similarly, the image table 508 stores image data associated with messages for which message data is stored in the entity table 502. The entity table 502 may associate various annotations from the annotation table 512 with various images and videos stored in the image table 508 and the video table 510.

A story table 506 stores data regarding collections of messages and associated image, video, or audio data, which are compiled into a collection (e.g., a story or a gallery). The creation of a particular collection may be initiated by a particular user (e.g., each user for which a record is maintained in the entity table 502). A user may create a "personal story" in the form of a collection of content that has been created and sent/broadcast by that user. To this end, the user interface of the messaging client application 402 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 402, to contribute content to a particular live story. The live story may be identified to the user by the messaging client application 402, based on his or her location. The end result is a "live story" told from a community perspective.

A further type of content collection is known as a "location story", which enables a user whose client device 100 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

Figure 6:
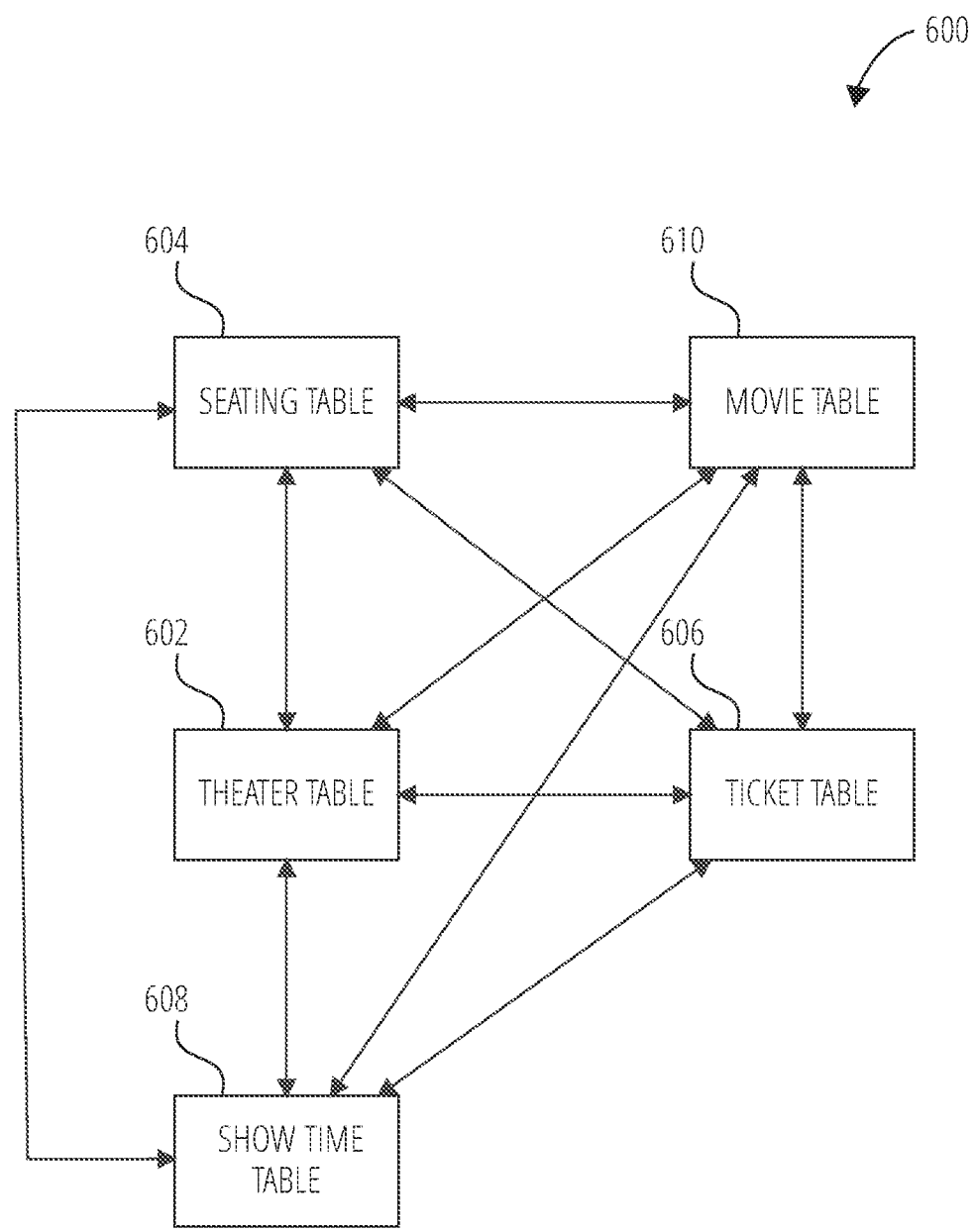
FIG. 6 illustrates a ticket tables 600 in accordance with some examples.

Ticket tables 600 are also stored and maintained within the database 418 by the ticket system 424 and include a number of tables, further details of which are provided with respect to FIG. 6.

The details of a ticket purchase, as facilitated by the ticket system 424 in conjunction with the messaging client application 402, will also be included within a record in the story table 506, so that the details may be included in a message content that is published by the relevant user. In some examples, details of a particular movie or event, for which tickets have been purchased by a user, may also be stored in the video table 510. For example, a user may publish a message that includes a trailer video for a movie that the user intends to see, and for which the user has purchased a movie ticket. In this way, a user can conveniently share details of a particular show time, as well as promotional material (e.g., the trailer) for a movie, with other users related to the publishing user within the entity graph 504.

FIG. 6 is a schematic diagram showing further details of the ticket tables 600, according to some examples. The ticket tables 600 include a theater table 602 (or a more generic venue table) storing a list of venues for which the ticket system 424 is able to present and transact event tickets. Associated with each venue for which a record is maintained in the theater table 602, corresponding seating data, representative of a set of seats within the relevant venue, is maintained within a seating table 604.

A movie table 610 (or a more generic event table) maintains a list of movies or events that are currently available, or will be becoming available, for viewing at venues recorded in the theater table 602, while a show time table 608 stores the show time data for each of these movies or events.

Finally, a ticket table 606 maintains ticket data representative of availability of seats within each of the theaters, for each of the movies at each of the show times. To this end, the ticket table 606 is shown to be indexed to the theater table 602, the seating table 604, the show time table 608, and the movie table 610.

As noted above, the ticket system 424 may operate to maintain and aggregate, in near real-time, ticket availability and sale information from multiple ticket vendors (e.g., venue ticketing systems 426). The ticket system 424 may accordingly operate to normalize and format data received from these disparate sources for storage within and updating of the ticket table 606.

Figure 7:
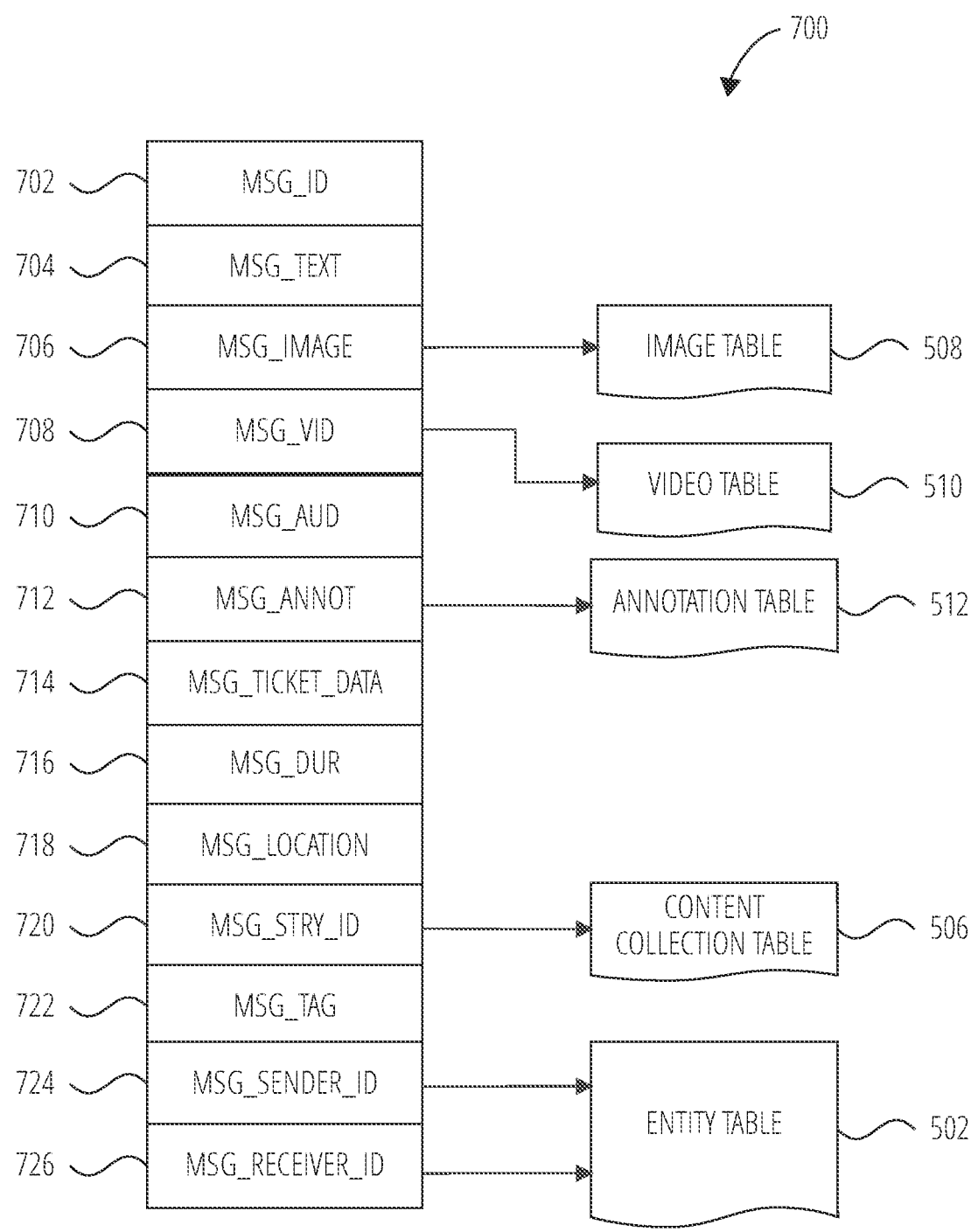
FIG. 7 is a diagrammatic representation of a message, in accordance with some examples.

FIG. 7 is a schematic diagram illustrating a structure of a message 700, according to some in some examples, generated by a messaging client application 402 for communication to a further messaging client application 402 or the messaging server application 414. The content of a particular message 700 is used to populate the message table 514 stored within the database 418, accessible by the messaging server application 414. Similarly, the content of a message 700 is stored in memory as "in-transit" or "in-flight" data of the client device 100 or the application server 412. The message 700 is shown to include the following components:

- A message identifier 702: a unique identifier that identifies the message 700.
- A message text payload 704: text, to be generated by a user via a user interface of the client device 100 and that is included in the message 700.
- A message image payload 706: image data, captured by a camera Component of a client device 100 or retrieved from a memory Component of a client device 100, and that is included in the message 700.
- A message video payload 708: video data, captured by a camera Component or retrieved from a memory Component of the client device 100 and that is included in the message 700.
- A message audio payload 710: audio data, captured by a microphone or retrieved from a memory Component of the client device 100, and that is included in the message 700.
- A message annotations 712: annotation data (e.g., filters, stickers or other enhancements) that represents annotations to be applied to message image payload 706, message video payload 708, or message audio payload 710 of the message 700.
- Message ticket data 714: details regarding a ticket purchase of a first user, including theater data, movie data, show time data, and seat data. The movie data may include additional multimedia data (e.g., a movie trailer video or graphic). The message ticket data 714 may be used by a messaging client application 402 to present a ticket user interface, such as ticket user interface 200, to a receiving user so as to allow receiving user to purchase a reservation ticket for a seat in close proximity to a seat that has been reserved by a sending user (and potentially other users stored within the entity graph 504 to which the receiving user and or the sending user are directly linked).
- A message duration parameter 716: parameter value indicating, in seconds, the amount of time for which content of the message (e.g., the message image payload 706, message video payload 708, message audio payload 710) is to be presented or made accessible to a user via the messaging client application 402.
- A message geolocation parameter 718: geolocation data (e.g., latitudinal and longitudinal coordinates) associated with the content payload of the message. Multiple message geolocation parameter 718 values may be included in the payload, each of these parameter values being associated with respect to content items included in the content (e.g., a specific image into within the message image payload 706, or a specific video in the message video payload 708).
- A message story identifier 720: identifier values identifying one or more content collections (e.g., "stories") with which a particular content item in the message image payload 706 of the message 700 is associated. For example, multiple images within the message image payload 706 may each be associated with multiple content collections using identifier values.
- A message tag 722: each message 700 may be tagged with multiple tags, each of which is indicative of the subject matter of content included in the message payload. For example, where a particular image included in the message image payload 706 depicts an animal (e.g., a lion), a tag value may be included within the message tag 722 that is indicative of the relevant animal. Tag values may be generated manually, based on user input, or may be automatically generated using, for example, image recognition.
- A message sender identifier 724: an identifier (e.g., a messaging system identifier, email address, or device identifier) indicative of a user of the client device 100 on which the message 700 was generated and from which the message 700 was sent
- A message receiver identifier 726: an identifier (e.g., a messaging system identifier, email address, or device identifier) indicative of a user of the client device 100 to which the message 700 is addressed.

The contents (e.g., values) of the various components of message 700 may be pointers to locations in tables within which content data values are stored. For example, an image value in the message image payload 706 may be a pointer to (or address of) a location within an image table 508. Similarly, values within the message video payload 708 may point to data stored within a video table 510, values stored within the message annotations 712 may point to data stored in an annotation table 512, values stored within the message story identifier 720 may point to data stored in a story table 506, and values stored within the message sender identifier 724 and the message receiver identifier 726 may point to user records stored within an entity table 502.

Figure 8:
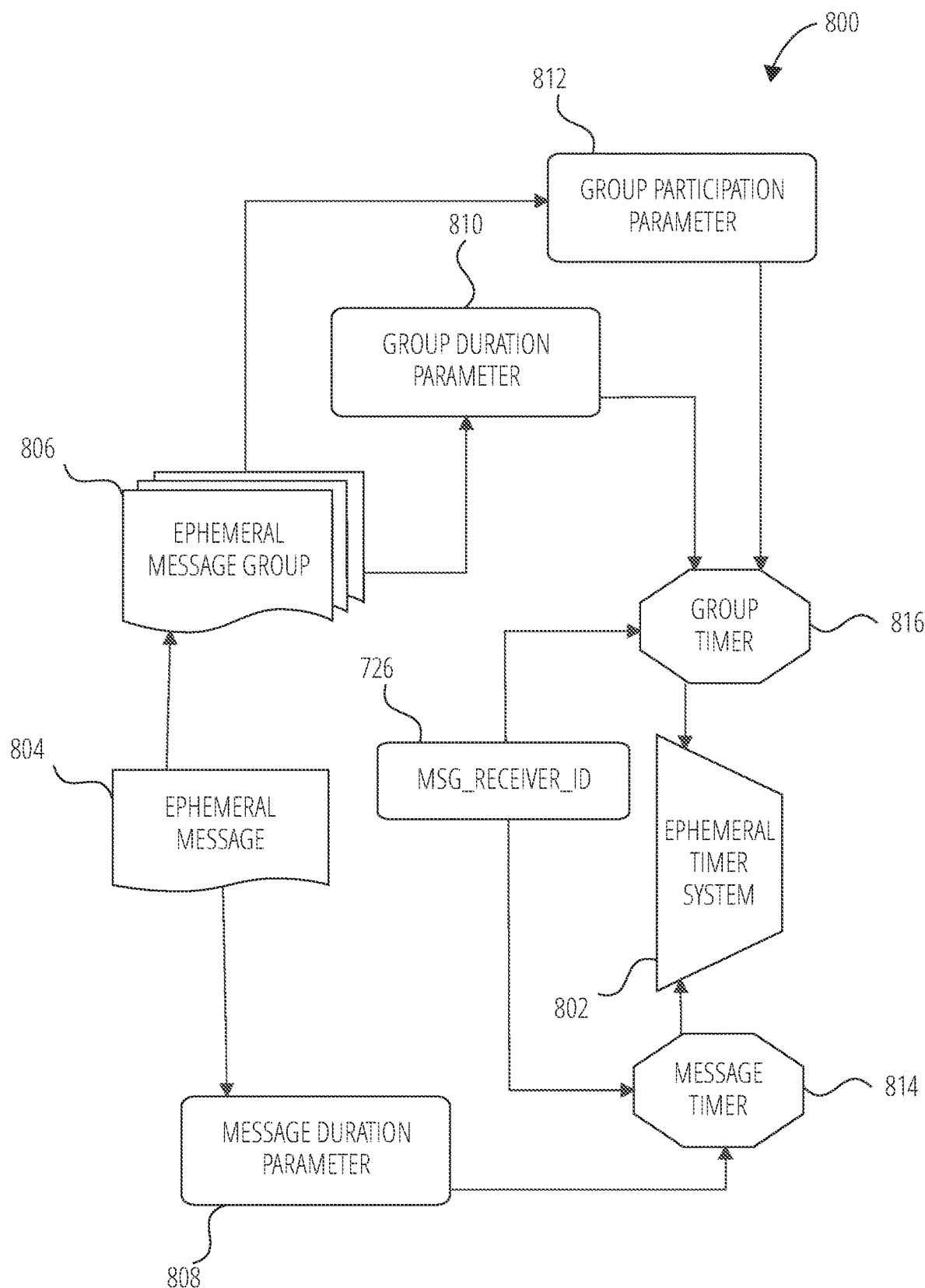
FIG. 8 is a flowchart for an access-limiting process, in accordance with some examples.
Figure 9:
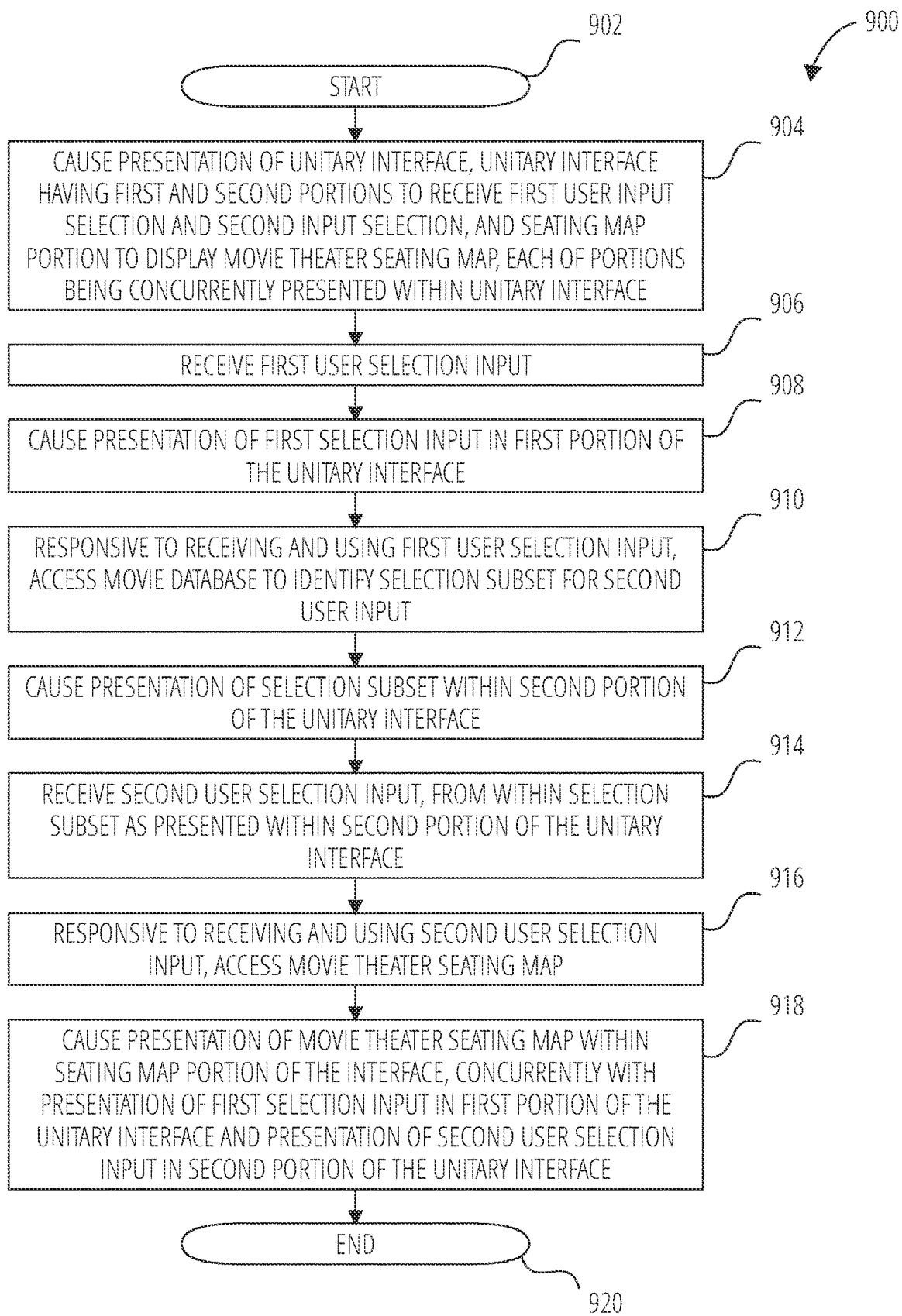
FIG. 9 illustrates a method 900 in accordance with some examples.
Figure 10:
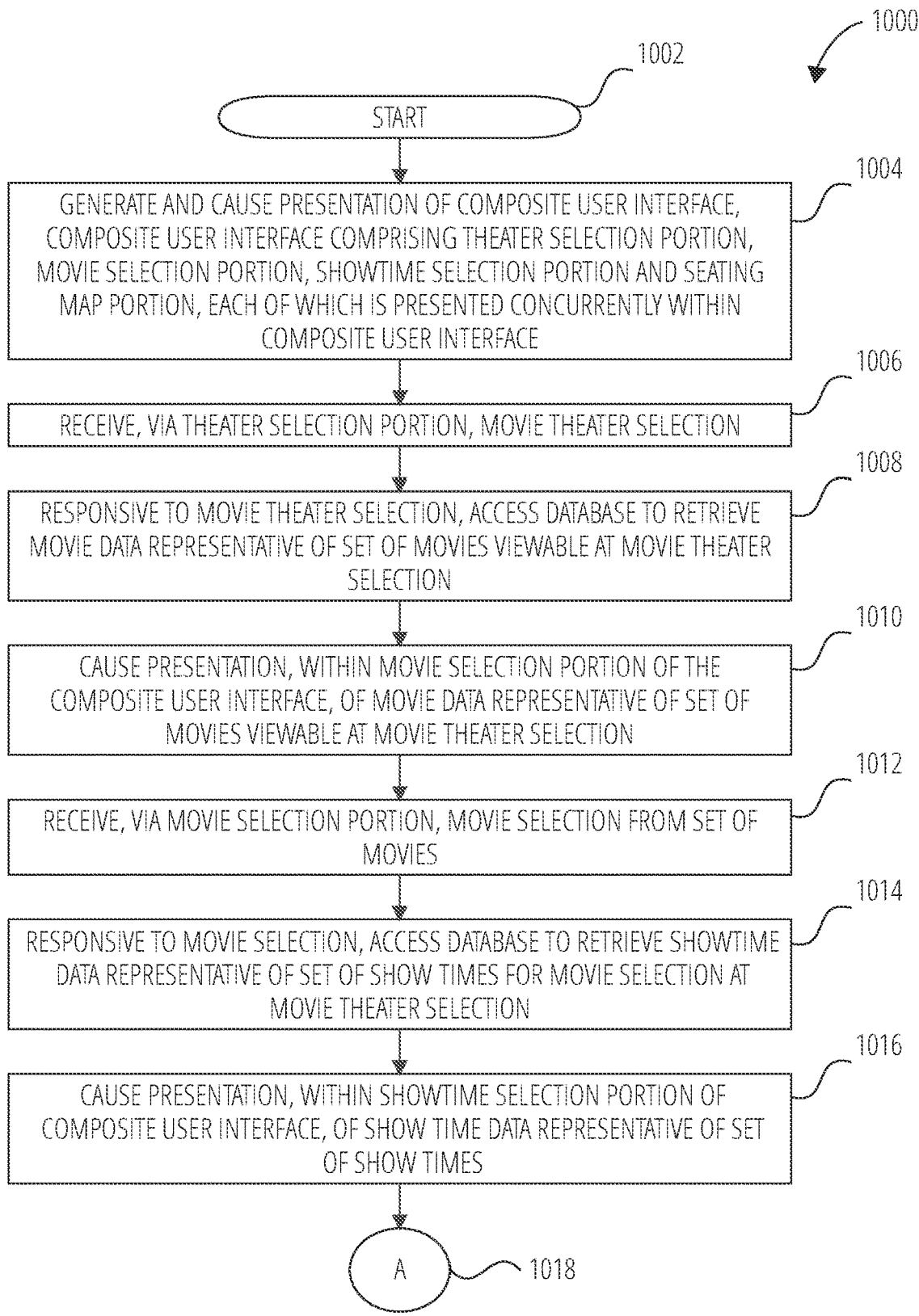
FIG. 10 illustrates a method 1000 in accordance with some examples.
Figure 11:
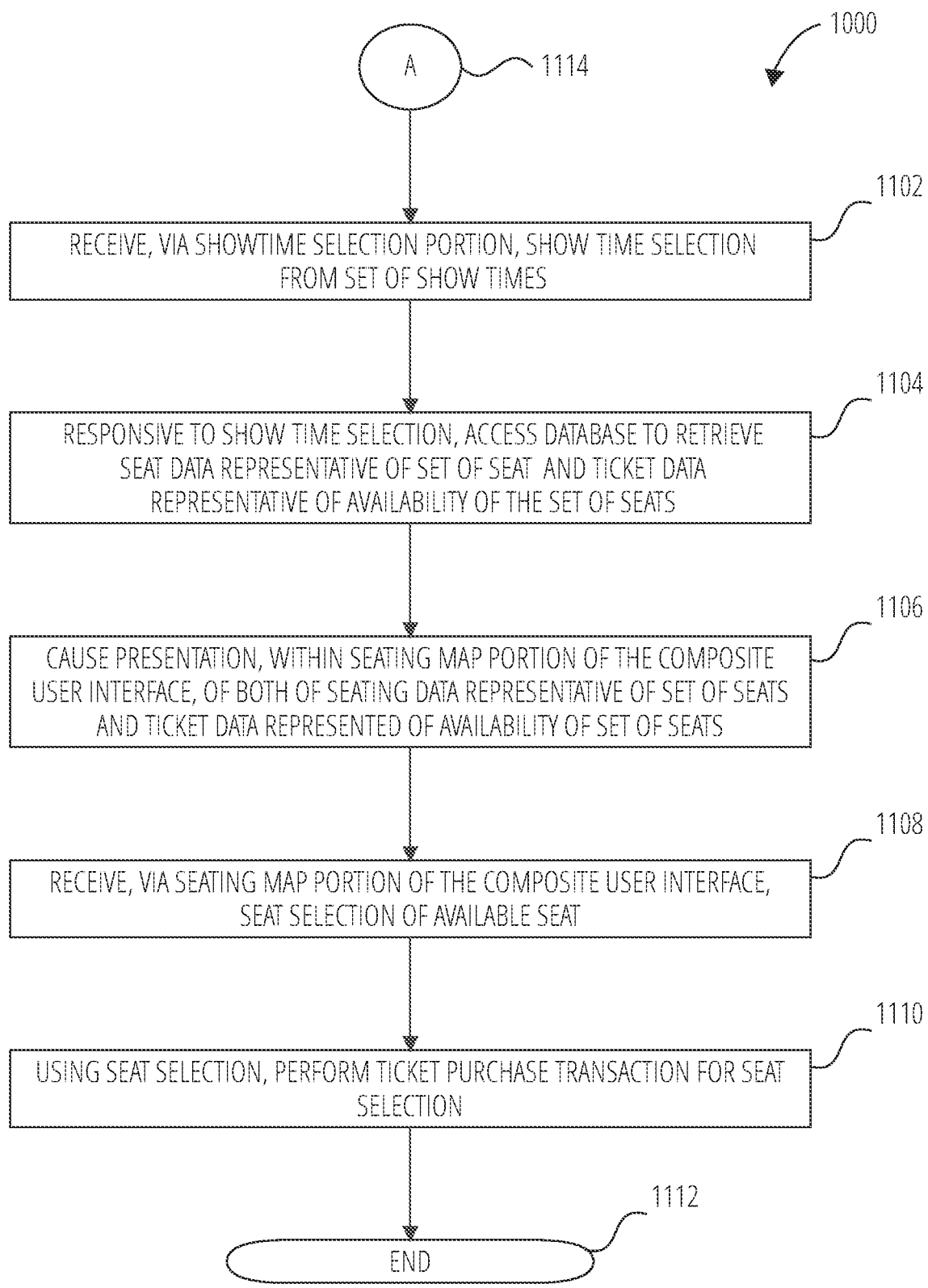
FIG. 11 illustrates a method 1000 in accordance with some examples.

FIG. 8 is a schematic diagram illustrating an access-limiting process 800, in terms of which access to content (e.g., an Ephemeral Message 804, and associated multimedia payload of data) or a content collection (e.g., an ephemeral message group 806) may be time-limited (e.g., made ephemeral).

An ephemeral message 804 is shown to be associated with a message duration parameter 808, the value of which determines an amount of time that the ephemeral message 804 will be displayed to a receiving user of the ephemeral message 804 by the messaging client application 402. In some examples, an ephemeral message 804 is viewable by a receiving user for up to a maximum of 10 seconds, depending on the amount of time that the sending user specifies using the message duration parameter 808.

The message duration parameter 808 and the message receiver identifier 726 are shown to be inputs to a message timer 814, which is responsible for determining the amount of time that the ephemeral message 804 is shown to a particular receiving user identified by the message receiver identifier 726. In particular, the ephemeral message 804 will be shown to the relevant receiving user for a time period determined by the value of the message duration parameter 808. The message timer 814 is shown to provide output to a more generalized ephemeral timer system 802, which is responsible for the overall timing of display of content (e.g., an Ephemeral Message 804) to a receiving user.

The ephemeral message 804 is shown in FIG. 8 to be included within an ephemeral message group 806 (e.g., a collection of messages in a personal story, or an event story). The ephemeral message group 806 has an associated group duration parameter 810, a value of which determines a time-duration for which the ephemeral message group 806 is presented and accessible to users of the messaging system 400. The group duration parameter 810, for example, may be the duration of a music concert, where the ephemeral message group 806 is a collection of content pertaining to that concert. Alternatively, a user (either the owning user or a curator user) may specify the value for the group duration parameter 810 when performing the setup and creation of the ephemeral message group 806.

Additionally, each ephemeral message 804 within the ephemeral message group 806 has an associated group participation parameter 812, a value of which determines the duration of time for which the ephemeral message 804 will be accessible within the context of the ephemeral message group 806. Accordingly, a particular ephemeral message group 806 may "expire" and become inaccessible within the context of the ephemeral message group 806, prior to the ephemeral message group 806 itself expiring in terms of the group duration parameter 810. The group duration parameter 810, group participation parameter 812, and message receiver identifier 726 each provide input to a group timer 816, which operationally determines, firstly, whether a particular ephemeral message 804 of the ephemeral message group 806 will be displayed to a particular receiving user and, if so, for how long. Note that the ephemeral message group 806 is also aware of the identity of the particular receiving user as a result of the message receiver identifier 726.

Accordingly, the group timer 816 operationally controls the overall lifespan of an associated ephemeral message group 806, as well as an individual ephemeral message 804 included in the ephemeral message group 806. In some examples, each ephemeral message 804 within the ephemeral message group 806 remains viewable and accessible for a time-period specified by the group duration parameter 810. In a further example, a certain ephemeral message 804 may expire, within the context of ephemeral message group 806, based on a group participation parameter 812. Note that a message duration parameter 808 may still determine the duration of time for which a particular ephemeral message 804 is displayed to a receiving user, even within the context of the ephemeral message group 806. Accordingly, the message duration parameter 808 determines the duration of time that a particular ephemeral message 804 is displayed to a receiving user, regardless of whether the receiving user is viewing that ephemeral message 804 inside or outside the context of an ephemeral message group 806.

The ephemeral timer system 802 may furthermore operationally remove a particular ephemeral message 804 from the ephemeral message group 806 based on a determination that it has exceeded an associated group participation parameter 812. For example, when a sending user has established a group participation parameter 812 of 24 hours from posting, the ephemeral timer system 802 will remove the relevant ephemeral message 804 from the ephemeral message group 806 after the specified 24 hours. The ephemeral timer system 802 also operates to remove an ephemeral message group 806 either when the group participation parameter 812 for each and ephemeral message 804 within the ephemeral message group 806 has expired, or when the ephemeral message group 806 itself has expired in terms of the group duration parameter 810.

In certain use cases, a creator of a particular ephemeral message group 806 may specify an indefinite group duration parameter 810. In this case, the expiration of the group participation parameter 812 for the last remaining ephemeral message 804 within the ephemeral message group 806 will determine when the ephemeral message group 806 itself expires. In this case, a new Ephemeral Message 804, added to the ephemeral message group 806, with a new group participation parameter 812, effectively extends the life of an ephemeral message group 806 to equal the value of the group participation parameter 812.

Responsive to the ephemeral timer system 802 determining that an ephemeral message group 806 has expired (e.g., is no longer accessible), the ephemeral timer system 802 communicates with the messaging system 400 (and, for example, specifically the messaging client application 402) to cause an indicium (e.g., an icon) associated with the relevant ephemeral message group 806 to no longer be displayed within a user interface of the messaging client application 402. Similarly, when the ephemeral timer system 802 determines that the message duration parameter 808 for a particular ephemeral message 804 has expired, the ephemeral timer system 802 causes the messaging client application 402 to no longer display an indicium (e.g., an icon or textual identification) associated with the Ephemeral Message 804.

In block 904, method 900 causes presentation of a unitary interface, the unitary interface having first and second portions to receive a first selection input and a second selection input, and a seating map portion to display a movie theater seating map, each of the portions being concurrently presented within the unitary interface. In block 906, method 900 receives the first selection input. In block 908, method 900 causes presentation of the first selection input in the first portion of the unitary interface. In block 910, method 900 responsive to receiving and using the first selection input, accesses a movie database to identify a selection subset for the second selection input. In block 912, method 900 causes presentation of the selection subset within the second portion of the unitary interface. In block 914, method 900 receives the second selection input, from within the selection subset as presented within the second portion of the unitary interface. In block 916, method 900 responsive to receiving and using the second selection input, accesses a movie theater seating map. In block 918, method 900 causes presentation of the movie theater seating map within the seating map portion of the interface, concurrently with the presentation of the first selection input in the first portion of the unitary interface and the presentation of the second selection input in the second portion of the unitary interface.

In block 1004, method 1000 generates and causes presentation of a composite user interface, the composite user interface comprising a theater selection portion, a movie selection portion, a show time selection portion and a seating map portion, each of which is presented concurrently within the composite user interface. In block 1006, method 1000 receives, via the theater selection portion, a movie theater selection. In block 1008, method 1000 responsive to the movie theater selection, accesses a database to retrieve movie data representative of a set of movies viewable at the movie theater selection. In block 1010, method 1000 causes presentation, within the movie selection portion of the composite user interface, of the movie data representative of the set of movies viewable at the movie theater selection. In block 1012, method 1000 receives, via the movie selection portion, a movie selection from the set of movies. In block 1014, method 1000 responsive to the movie selection, accesses the database to retrieve show time data representative of a set of show times for the movie selection at the movie theater selection. In block 1016, method 1000 causes presentation, within the show time selection portion of the composite user interface, of the show time data representative of the set of show times.

In block 1102, method 1000 receives, via the show time selection portion, a show time selection from the set of show times. In block 1104, method 1000 responsive to the show time selection, accesses the database to retrieve seats data and ticket data. The seat data is representative of a set of seats in the movie theater selection at the movie selection and the show time selection. The ticket data is representative of availability of the set of seats. In block 1106, method 1000 causes presentation, within the seating map portion of the composite user interface, of both of the seating data representative of the set of seats and the ticket data represented of the availability of the set of seats. In block 1110, method 1000 receives, via the seating map portion of the composite user interface, a seat selection of an available seat. In block 1110, method 1000 using the seat selection, performs a ticket purchase transaction for the seat selection.

Figure 12:
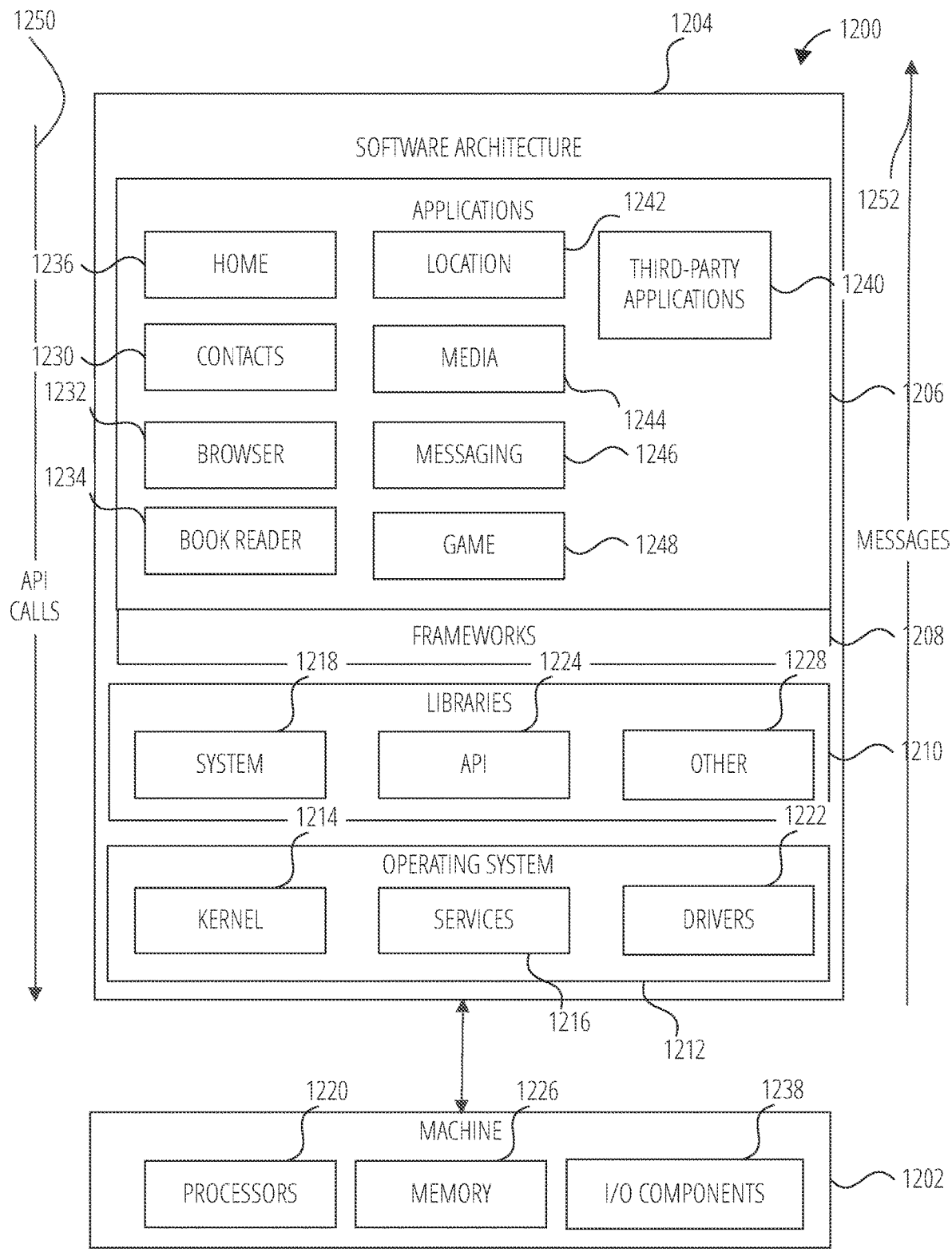
FIG. 12 is a block diagram showing a software architecture within which the present disclosure may be implemented, in accordance with some examples.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), Component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a high-level common infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In some examples, the applications 1206 may include a home application 1236, a contacts application 1230, a browser application 1232, a book reader application 1234, a location application 1242, a media application 1244, a messaging application 1246, a game application 1248, and a broad assortment of other applications such as third-party applications 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party applications 1240 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1240 can invoke the API calls 1250 provided by the operating system 1212 to facilitate functionality described herein.

Figure 13:
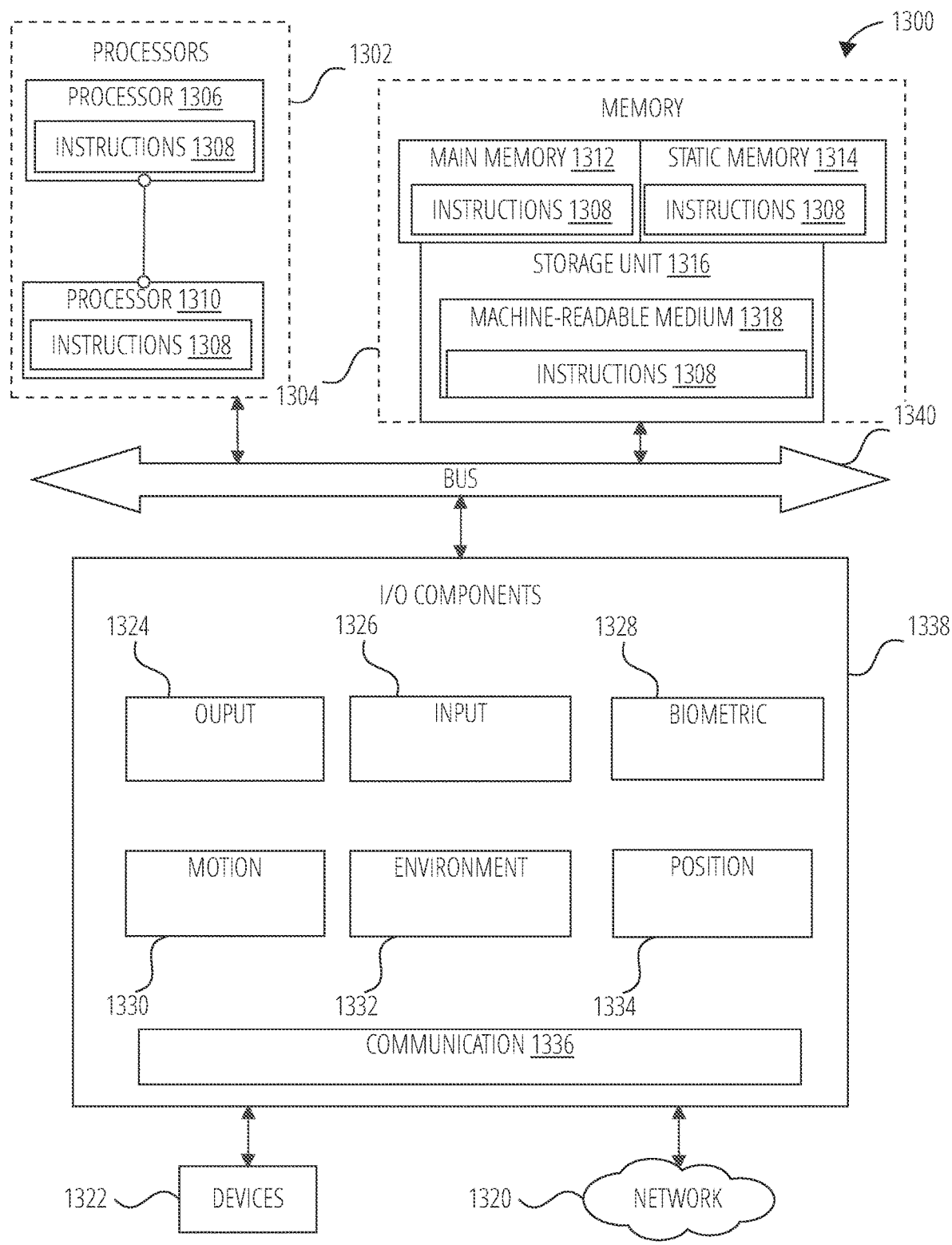
FIG. 13 is a diagrammatic representation of a machine in the form of a computer system within which a set of instructions may be executed for causing the machine to perform any one or more of the methodologies discussed herein, in accordance with some examples.

FIG. 13 is a diagrammatic representation of the machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include processors 1302, memory 1304, and I/O components 1338, which may be configured to communicate with each other via a bus 1340. In an example, the processors 1302 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1306 and a Processor 1310 that execute the instructions 1308. The term "Processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1340. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors 1302 (e.g., within the Processor's cache memory), or any suitable combination thereof, during execution thereof by the machine 1300.

The I/O components 1338 may include a wide variety of components to receive input, provide output, produce output, transmit information, exchange information, capture measurements, and so on. The specific I/O components 1338 that are included in a particular machine will depend on the type of machine. For example, portable machines such as mobile phones may include a touch input device or other such input mechanisms, while a headless server machine will likely not include such a touch input device. It will be appreciated that the I/O components 1338 may include many other components that are not shown in FIG. 13. In various examples, the I/O components 1338 may include output components 1324 and input components 1326. The output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1338 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1330 include acceleration sensor components (e.g., accelerometer), gravitation sensor components, rotation sensor components (e.g., gyroscope). The environmental components 1332 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1334 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 1338 further include communication components 1336 operable to couple the machine 1300 to a network 1320 or devices 1322 via respective coupling or connections. For example, the communication components 1336 may include a network interface Component or another suitable device to interface with the network 1320. In further examples, the communication components 1336 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1312, static memory 1314, and/or memory of the processors 1302) and/or storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed examples.

The instructions 1308 may be transmitted or received over the network 1320, using a transmission medium, via a network interface device (e.g., a network interface Component included in the communication components 1336) and using any one of several well-known transfer protocols (e.g., hypertext transfer protocol (HTTP)). Similarly, the instructions 1308 may be transmitted or received using a transmission medium via a coupling (e.g., a peer-to-peer coupling) to the devices 1322.

Figure 14:
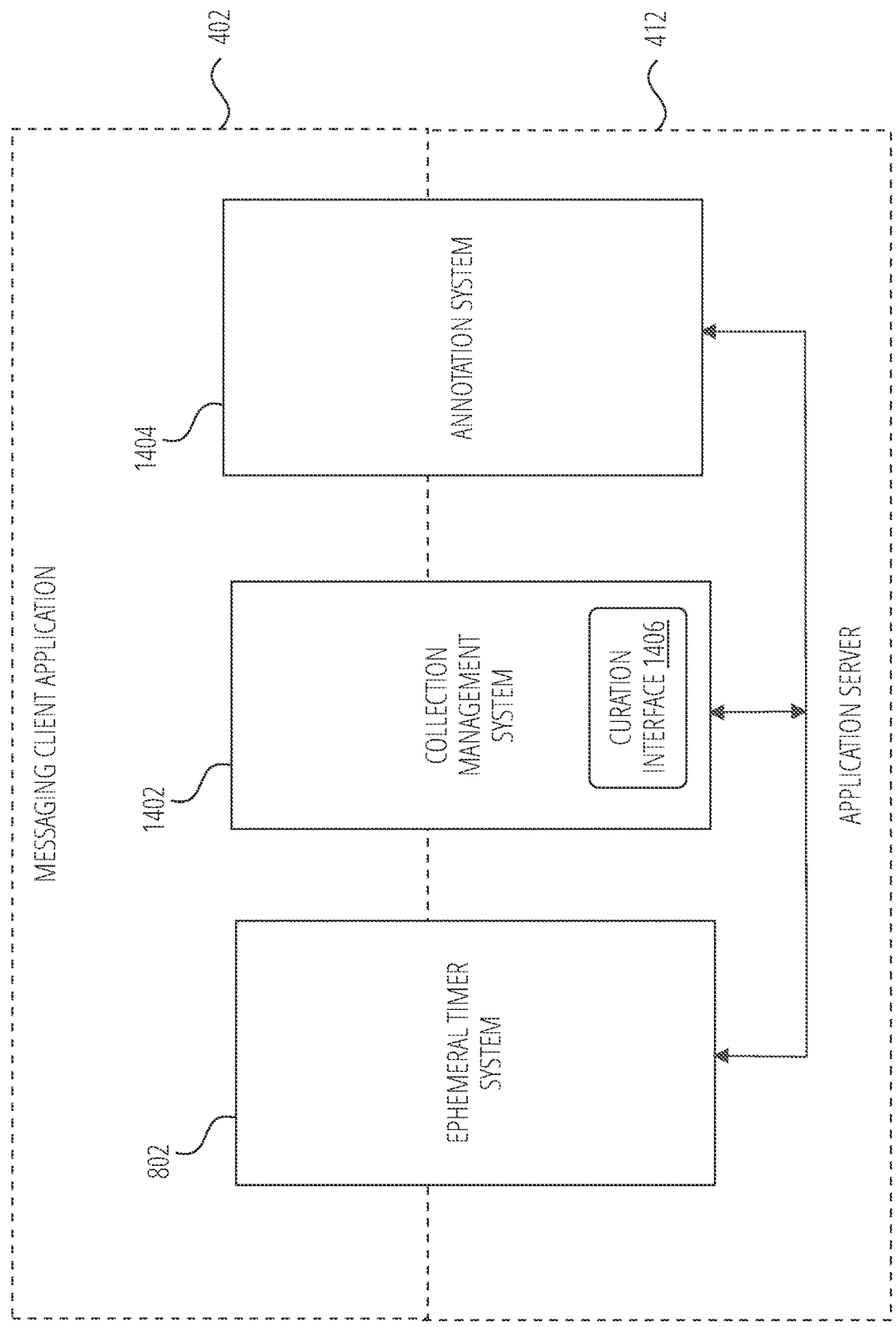
FIG. 14 is a diagrammatic representation of a messaging client application, in accordance with some examples.

FIG. 14 is block diagram illustrating further details regarding the messaging system 400, according to examples. Specifically, the messaging system 400 is shown to comprise the messaging client application 402 and the application server 412, which in turn embody a number of some subsystems, namely an ephemeral timer system 802, a collection management system 1402 and an annotation system 1404.

The ephemeral timer system 802 is responsible for enforcing the temporary access to content permitted by the messaging client application 402 and the messaging server application 414. To this end, the ephemeral timer system 802 incorporates a number of timers that, based on duration and display parameters associated with a message, or collection of messages (e.g., a story), selectively display and enable access to messages and associated content via the messaging client application 402. Further details regarding the operation of the ephemeral timer system 802 are provided below.

The collection management system 1402 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 1402 may also be responsible for publishing an icon that provides notification of the existence of a particular collection to the user interface of the messaging client application 402.

The collection management system 1402 furthermore includes a curation interface 1406 that allows a collection manager to manage and curate a particular collection of content. For example, the curation interface 1406 enables an event organizer to curate a collection of content relating to a specific event (e.g., delete inappropriate content or redundant messages). Additionally, the collection management system 1402 employs machine vision (or image recognition technology) and content rules to automatically curate a content collection. In certain examples, compensation may be paid to a user for inclusion of user-generated content into a collection. In such cases, the curation interface 1406 operates to automatically make payments to such users for the use of their content.

The annotation system 1404 provides various functions that enable a user to annotate or otherwise modify or edit media content associated with a message. For example, the annotation system 1404 provides functions related to the generation and publishing of media overlays for messages processed by the messaging system 400. The annotation system 1404 operatively supplies a media overlay or supplementation (e.g., an image filter) to the messaging client application 402 based on a geolocation of the client device 100. In another example, the annotation system 1404 operatively supplies a media overlay to the messaging client application 402 based on other information, such as social network information of the user of the client device 100. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 100. For example, the media overlay may include text that can be overlaid on top of a photograph taken by the client device 100. In another example, the media overlay includes an identification of a location overlay (e.g., Venice beach), a name of a live event, or a name of a merchant overlay (e.g., Beach Coffee House). In another example, the annotation system 1404 uses the geolocation of the client device 100 to identify a media overlay that includes the name of a merchant at the geolocation of the client device 100. The media overlay may include other indicia associated with the merchant. The media overlays may be stored in the database 418 and accessed through the database server 420.

In some examples, the annotation system 1404 provides a user-based publication platform that enables users to select a geolocation on a map, and upload content associated with the selected geolocation. The user may also specify circumstances under which a particular media overlay should be offered to other users. The annotation system 1404 generates a media overlay that includes the uploaded content and associates the uploaded content with the selected geolocation.

In some examples, the annotation system 1404 provides a merchant-based publication platform that enables merchants to select a particular media overlay associated with a geolocation via a bidding process. For example, the annotation system 1404 associates the media overlay of a highest bidding merchant with a corresponding geolocation for a predefined amount of time.

Figure 15:
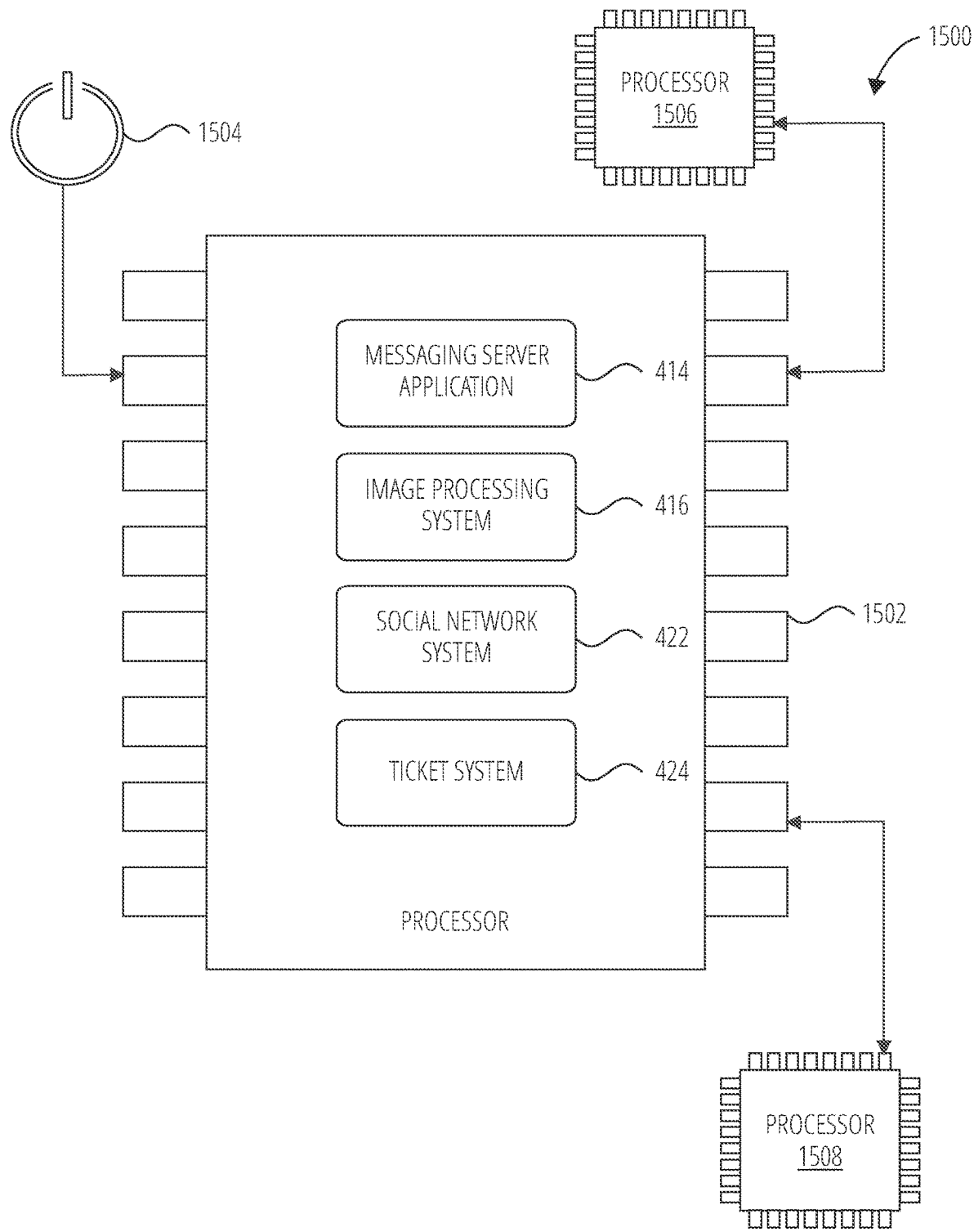
FIG. 15 is a diagrammatic representation of a processing environment, in accordance with some examples.

Turning now to FIG. 15, there is shown a diagrammatic representation of a processing environment 1500, which includes the processor 1506, the processor 1508, and a processor 1502 (e.g., a GPU, CPU, or combination thereof).

The processor 1502 is shown to be coupled to a power source 1504, and to include (either permanently configured or temporarily instantiated) modules, namely the messaging server application 414, the image processing system 416, the social network system 422, and the ticket system 424. As illustrated, the processor 1502 is communicatively coupled to both the processor 1506 and processor 1508.

Statements

A method to generate a user-interface for a movie ticket reservation, the method comprising: causing presentation of a unitary interface, the unitary interface having first and second portions to receive a first selection input and a second selection input, and a seating map portion to display a movie theater seating map, each of the portions being concurrently presented within the unitary interface; receiving the first selection input; causing presentation of the first selection input in the first portion of the unitary interface; responsive to receiving and using the first selection input, accessing a movie database to identify a selection subset for the second selection input; causing presentation of the selection subset within the second portion of the unitary interface; receiving the second selection input, from within the selection subset as presented within the second portion of the unitary interface, responsive to receiving and using the second selection input, accessing the movie theater seating map; and causing presentation of the movie theater seating map within the seating map portion of the interface, concurrently with the presentation of the first selection input in the first portion of the unitary interface and the presentation of the second selection input in the second portion of the unitary interface.

The method according to any one or more of the preceding statements, wherein the unitary interface has a third portion to receive a third selection input, the method further comprising, responsive to receiving and the third selection input, retrieving the movie theater seating map based on both the second selection input and the third selection input.

The method according to any one or more of the preceding statements, wherein the first portion of the unitary interface is a movie selection portion, and the first selection input is a movie selection.

The method according to any one or more of the preceding statements, wherein the selection subset for the second selection input is a selection of show times for the movie selection at a specified movie theater.

The method according to any one or more of the preceding statements, wherein the third portion is a location selection portion, and the third selection input is a geographic region including at least one movie theater.

The method according to any one or more of the preceding statements, wherein the third selection is a theater selection portion, and the third selection input is a specific movie theater.

The method according to anyone or more of the preceding statements, comprising, responsive to receiving the second selection, accessing ticket information; and causing presentation, in conjunction with the movie theater seating map within the seating map portion of the interface, seat availability indicia based on the ticket information.

The method according to anyone or more of the preceding statements, wherein the seating availability indicia indicates available seats in the movie theater seating map.

The method according to anyone or more of the preceding statements, comprising, responsive to the second selection: accessing social network information; using the social network information and the ticket information, identifying related entities within the social network of a first user that have purchased tickets for a showing of a selected movie as a selected show time; and displaying social indicia of the related entities within the context of the movie theater seating map.

10. The method according to anyone or more of the preceding statements, including, responsive to a messaging input from a first user, transmitting a ticket message to related entities within a social network of the first user, the ticket message displaying a movie title, a movie location, a movie show time, and ticket availability information to the related entities.

11. A method to facilitate selection of movie theater tickets, the method comprising:

generating and causing presentation of a composite user interface, the composite user interface comprising a theater selection portion, a movie selection portion, a show time selection portion and a seating map portion, each of which is presented concurrently within the composite user interface;

receiving, via the theater selection portion, a movie theater selection;

responsive to the movie theater selection, accessing a database to retrieve movie data representative of a set of movies viewable at the movie theater selection;

causing presentation, within the movie selection portion of the composite user interface, of the movie data representative of the set of movies viewable at the movie theater selection;

receiving, via the movie selection portion, a movie selection from the set of movies;

responsive to the movie selection, accessing the database to retrieve show time data representative of a set of show times for the movie selection at the movie theater selection;

causing presentation, within the show time selection portion of the composite user interface, of the show time data representative of the set of show times;

receiving, via the show time selection portion, a show time selection from the set of show times;

responsive to the show time selection, accessing the database to retrieve:

seating data representative of a set of seats in the movie theater selection at the movie selection and the show time selection;

ticket data representative of availability of the set of seats; and causing presentation, within the seating map portion of the composite user interface, of both of the seating data representative of the set of seats and the ticket data represented of the availability of the set of seats;

receiving, via the seating map portion of the composite user interface, a seat selection of an available seat; and using the seat selection, performing a ticket purchase transaction for the seat selection.

The method according to anyone or more of the preceding statements, wherein the composite user interface includes a transaction control, and the ticket purchase transaction is initiated responsive to receipt of user selection of the transaction control.

1 The method according to anyone or more of the preceding statements, further comprising:

responsive to the show time selection, accessing the database to retrieve social network data representative of friend entities associated with a first user;

determining, using the social network data and the ticket data, that a friend entity associated with the first user has purchased a purchased seat within the set of seats; and causing presentation, within the seating map portion of the composite user interface, of a friend entity indicium in association with the purchased seat.

The method according to anyone or more of the preceding statements, wherein the composition user interface includes a message control, the method further comprising:

receiving, via the message control, a message transmission request;

responsive to receipt of the message transmission request, accessing the database retrieve social network data representative of friend entities associated with a first user; and using the social network data, transmitting a ticket message to a friend entity associated with a first user, the ticket message including the seating data, and the ticket data.

The method according to any one or more of the preceding statements, wherein the ticket message further includes an invitation to purchase a seat ticket for an available seat of the set of seats.

The method according to any one or more of the preceding statements, wherein the seat message further includes an indicium showing a seat selection of the first user.

What is claimed is:

1. A method to generate a user-interface for a movie ticket reservation, the method comprising:

causing presentation of a unitary interface, the unitary interface having a venue selection portion to receive a first user selection input, an event selection portion to receive a second selection input, and a seating map portion to display movie theater seating maps, each of the venue selection portion, second and seating map portions being concurrently presented within the unitary interface;

receiving the first selection input indicating a first venue for one or more events;

causing presentation of the first selection input in the venue selection portion of the unitary interface, wherein the venue selection portion includes a scroll button that is selectable to modify the first venue to a second venue;

responsive to receiving the first selection input, causing presentation, within the unitary interface, of a multimedia content item associated with the first selection input and accessing a movie database to identify a selection subset for the second selection input, the selection subset including the one or more events;

causing presentation of the selection subset within the event selection portion of the unitary interface;

receiving the second selection input, from the selection subset as presented within the event selection portion of the unitary interface, responsive to receiving and using the second selection input, accessing a first movie theater seating map corresponding to the first venue;

causing presentation of the first movie theater seating map within the seating map portion of the unitary interface, concurrently with the presentation of the multimedia content item in the unitary interface, the presentation of the first selection input in the venue selection portion of the unitary interface, and the presentation of the second selection input in the event selection portion of the unitary interface;

receiving additional input indicating selection of the scroll button;

responsive to selection of the scroll button, causing presentation of the second venue in the venue selection portion of the unitary interface and accessing the movie database to identify an additional selection subset for the second venue, the additional selection subset including one or more additional events related to the second venue;

modifying the second portion of the unitary interface to display the additional selection subset while displaying the second venue in the venue selection portion; and modifying the seating map portion of the unitary interface to include a second movie theater seating map corresponding to the second venue.

2. The method of claim 1, wherein the unitary interface has a-third an additional portion to receive a third selection input, the method further comprising, responsive to receiving the third selection input, retrieving the first movie theater seating map based on both the second selection input and the third selection input.

3. The method of claim 2, wherein the additional portion of the unitary interface is a show time selection portion that includes one or more show times for a movie selection that corresponds to the event selection.

4. The method of claim 1, wherein the event selection portion of the unitary interface is a movie selection portion, the second selection input is a movie selection, and the multimedia content item is a digital video of the movie selection.

5. The method of claim 1, wherein the first venue and the second venue include movie theaters located in a geographic region.

6. The method of claim 5, comprising determining the geographic region based on a geographic positioning system (GPS) location of a mobile computing device.

7. The method of claim 1, comprising, responsive to receiving the second selection input, accessing ticket information; and causing presentation, in conjunction with the first movie theater seating map within the seating map portion of the interface, seat availability indicia based on the ticket information.

8. The method of claim 7, wherein the seating availability indicia indicates available seats in the first movie theater seating map.

9. The method of claim 7, comprising, responsive to the second selection input:

accessing social network information:

using the social network information and the ticket information, identifying related entities within the social network of a first user that have purchased tickets for a showing of a selected movie as a selected show time; and displaying social indicia of the related entities in the seating map portion.

10. The method of claim 1, including, responsive to a messaging input from a first user, transmitting a ticket message to related entities within a social network of the first user, the ticket message displaying a movie title, a movie location, a movie show time, and ticket availability information to the related entities.

11. A method to facilitate selection of movie theater tickets, the method comprising:
generating and causing presentation of a composite user interface, the composite user interface comprising a theater selection portion, a movie selection portion, a show time selection portion and a seating map portion, each of which is presented concurrently within the composite user interface;
receiving, via the theater selection portion, a first movie theater selection that corresponds to a first movie theater, the theater selection portion including a scroll button that is selectable to modify the first movie theater to a second movie theater;
responsive to the first movie theater selection, accessing a database to retrieve movie data representative of a set of movies viewable at the first movie theater;
causing presentation, within the movie selection portion of the composite user interface, of the movie data representative of the set of movies viewable at the first movie theater;
receiving, via the movie selection portion, a movie selection from the set of movies;
causing presentation, within the composite user interface, of a multimedia content item associated with the movie selection from the set of movies concurrently with the show time selection portion and seating map portion;
responsive to the movie selection, accessing the database to retrieve show time data representative of a set of show times for the movie selection at the first movie theater;
causing presentation, within the show time selection portion of the composite user interface, of the show time data representative of the set of show times;
receiving, via the show time selection portion, a show time selection from the set of show times;
responsive to the show time selection, accessing the database to retrieve seating data representative of a set of seats and ticket data represented of availability of the set of seats;
causing presentation, within the seating map portion of the composite user interface, of the seating data representative of the set of seats and the ticket data represented of the availability of the set of seats;
receiving, via the seating map portion of the composite user interface, a seat selection of an available seat;
using the seat selection, performing a ticket purchase transaction for the seat selection;
receiving additional input indicating selection of the scroll button;
responsive to selection of the scroll button, causing presentation of the second movie theater in the theater selection portion of the composite user interface and accessing the database to identify an additional set of movies viewable at the second movie theater;
modifying the movie selection portion of the composite interface to display the additional set of movies while displaying the second movie theater in the theater selection portion; and
modifying the seating map portion of the composite interface to include an additional set of sets available for the second movie.

12. The method of claim 11, wherein the multimedia content item is a digital video of the movie selection, the composite user interface includes a transaction control, and the ticket purchase transaction is initiated responsive to receipt of user selection of the transaction control.

13. The method of claim 11, further comprising:
responsive to the show time selection, accessing the database to retrieve social network data representative of friend entities associated with a first user;
determining, using the social network data and the ticket data, that a friend entity associated with the first user has purchased a purchased seat within the set of seats; and
causing presentation, within the seating map portion of the composite user interface, of a friend entity indicium in association with the purchased seat.

14. The method of claim 11, wherein the composite user interface includes a message control, the method further comprising:
receiving, via the message control, a message transmission request;
responsive to receipt of the message transmission request, accessing the database retrieve social network data representative of friend entities associated with a first user; and
using the social network data, transmitting a ticket message to a friend entity associated with a first user, the ticket message including the seating data, and the ticket data.

15. The method of claim 14, wherein the ticket message further includes an invitation to purchase a seat ticket for an available seat of the set of seats.

16. The method of claim 15, wherein the seat message further includes an indicium showing a seat selection of the first user.

17. A non-transitory computer-readable storage medium, the computer-readable storage medium including instructions that when executed by a computer, cause the computer to:
cause presentation of a unitary interface, the unitary interface having a venue selection portion to receive a first selection input and an event selection portion to receive a second selection input, and a seating map portion to display movie theater seating maps, each of the portions being concurrently presented within the unitary interface;
receive the first selection input indicating a first venue for one or more events;
cause presentation of the first selection input in the venue selection portion of the unitary interface, wherein the venue selection portion includes a scroll button that is selectable to modify the first venue to a second venue;
responsive to receiving and using the first selection input, cause presentation, within the unitary interface, of a multimedia content item associated with the first selection input and access a movie database to identify a selection subset for the second selection input, the selection subset including the one or more events;
cause presentation of the selection subset within the event selection portion of the unitary interface;
receive the second selection input, from within the selection subset as presented within the event selection portion of the unitary interface,
responsive to receiving and using the second selection input, access a first movie theater seating map corresponding to the first venue;

cause presentation of the first movie theater seating map within the seating map portion of the interface, concurrently with the presentation of the multimedia content item in the unitary interface, the presentation of the first selection input in the venue selection portion of the unitary interface, and the presentation of the second selection input in the event selection portion of the unitary interface;

receive additional input indicating selection of the scroll button;

responsive to selection of the scroll button, cause presentation of the second venue in the venue selection portion of the unitary interface and access the movie database to identify an additional selection subset for the second venue, the additional selection subset including one or more additional events related to the second venue;

modify the second portion of the unitary interface to display the additional selection subset while displaying the second venue in the venue selection portion; and modify the seating map portion of the unitary interface to include a second movie theater seating map corresponding to the second venue.

18. The computer-readable storage medium of claim 17, wherein the unitary interface has an additional portion to receive a third selection input, wherein the instructions further configure the computer to, responsive to receiving and using the third selection input, retrieve the first movie theater seating map based on the second selection input and the third selection input.

19. A computing apparatus, the computing apparatus comprising:
a processor; and
a memory storing instructions that, when executed by the processor, configure the apparatus to:
cause presentation of a unitary interface, the unitary interface having a venue selection portion to receive a first selection input and an event selection portion to receive a second selection input, and a seating map portion to display movie theater seating maps, each of the portions being concurrently presented within the unitary interface;
receive the first selection input indicating a first venue for one or more events;
cause presentation of the first selection input in the venue selection portion of the unitary interface, wherein the venue selection portion includes a scroll button that is selectable to modify the first venue to a second venue;
responsive to receiving and using the first selection input, cause presentation, within the unitary interface, of a multimedia content item associated with the first selection input and access a movie database to identify a selection subset for the second selection input, the selection subset including the one or more events;
cause presentation of the selection subset within the event selection portion of the unitary interface;
receive the second selection input, from within the selection subset as presented within the event selection portion of the unitary interface,
responsive to receiving and using the second selection input, access a first movie theater seating map corresponding to the first venue;
cause presentation of the first movie theater seating map within the seating map portion of the interface, concurrently with the presentation of the multimedia content item in the unitary interface, the presentation of the first selection input in the venue selection portion of the unitary interface, and the presentation of the second selection input in the event selection portion of the unitary interface; and receive additional input indicating selection of the scroll button;

responsive to selection of the scroll button, cause presentation of the second venue in the venue selection portion of the unitary interface and access the movie database to identify an additional selection subset for the second venue, the additional selection subset including one or more additional events related to the second venue;

modify the second portion of the unitary interface to display the additional selection subset while displaying the second venue in the venue selection portion; and modify the seating map portion of the unitary interface to include a second movie theater seating map corresponding to the second venue.

20. The computing apparatus of claim 19, wherein the unitary interface has an additional portion to receive a third selection input, wherein the instructions further configure the apparatus to, responsive to receiving and the third selection input, retrieve the first movie theater seating map based the second selection input and the third selection input.

21. The computing apparatus of claim 20, wherein the additional portion of the unitary interface is a show time selection portion that includes one or more show times for a movie selection that corresponds to the event selection.

22. The computing apparatus of claim 19, wherein the event selection portion of the unitary user interface is a movie selection portion, the second selection input is a movie selection, and multimedia content item is a digital video of the movie selection.

23. The computing apparatus of claim 19, wherein the first venue and the second venue include movie theaters located in a geographic region.

24. The computing apparatus of claim 23, comprising determining the geographic region based on a geographic positioning system (GPS) location of a mobile computing device.

25. The computing apparatus of claim 19, further comprising, responsive to receiving the second selection input, accessing ticket information; and causing presentation, in conjunction with the first movie theater seating map within the seating map portion of the interface, of seat availability indicia based on the ticket information.

26. The computing apparatus of claim 25, wherein the seat availability indicia indicates available seats in the first movie theater seating map.

27. The computing apparatus of claim 25, comprising, responsive to the second selection input:
accessing social network information;
using the social network information and the ticket information, identify related entities within a social network of a first user that have purchased tickets for a showing of a selected movie as a selected show time; and
display social indicia of the related entities in the seating map portion.

28. The computing apparatus of claim 19, include, responsive to a messaging input from a first user, transmitting a ticket message to related entities within a social network of the first user, the ticket message displaying a movie title, a movie location, a movie show time, and ticket availability information to the related entities.

29. The computing apparatus of claim 19, wherein the instructions further configure the apparatus to:

responsive to a selected show time corresponding to an event displayed in the event selection portion, access the database to retrieve:

seat data representative of a set of seats in a venue displayed in the venue selection portion for an event at the selected show time.

30. The computing apparatus of claim 29, wherein the instructions further configure the apparatus to:

determine, using the social network information and the ticket information, that a friend entity associated with the first user has purchased a purchased seat within the set of seats.

\* \* \* \* \*